(12) United States Patent
Helm

(10) Patent No.: US 7,081,203 B2
(45) Date of Patent: Jul. 25, 2006

(54) COMPACT SURFACE MOUNTED ON-SITE WASTEWATER TREATMENT UNIT

(76) Inventor: Glenn Helm, 25448 Port Gamble Rd. NE., Poulsbo, WA (US) 98370

( * ) Notice: Subject to any disclaimer, the term of this patent is extended or adjusted under 35 U.S.C. 154(b) by 54 days.

(21) Appl. No.: 10/839,974

(22) Filed: May 6, 2004

(65) Prior Publication Data
US 2005/0205491 A1 Sep. 22, 2005

Related U.S. Application Data

(60) Provisional application No. 60/553,819, filed on Mar. 16, 2004.

(51) Int. Cl.
C02F 3/06 (2006.01)

(52) U.S. Cl. .................. 210/617; 210/747; 210/150; 210/151; 210/170; 210/532.2

(58) Field of Classification Search ............... 210/617, 210/797, 150, 151, 170, 259, 299, 265, 266, 210/532.2
See application file for complete search history.

(56) References Cited

U.S. PATENT DOCUMENTS

| | | |
|---|---|---|
| 212,023 A | 2/1879 | Maeurer |
| 690,333 A | 12/1901 | Wanner |
| 699,345 A | 5/1902 | Provost, Jr. |
| 800,187 A * | 9/1905 | Venable ............ 210/150 |
| 956,665 A * | 5/1910 | Ashley ............ 210/150 |
| 1,738,521 A | 12/1929 | Bomhoff |
| 1,950,841 A * | 3/1934 | Crawford ............ 210/150 |
| 2,590,964 A | 4/1952 | Halvorson |
| 3,123,556 A | 3/1964 | Gilbert |
| 3,126,333 A | 3/1964 | Williams |
| 3,215,274 A | 11/1965 | Schreiber |
| 3,219,577 A | 11/1965 | Powers, III |
| 3,238,124 A | 3/1966 | Burton |
| 3,407,935 A | 10/1968 | Burton |
| 3,543,937 A | 12/1970 | Choun |
| 3,617,541 A | 11/1971 | Pan |
| 3,770,623 A * | 11/1973 | Seidel ............ 210/170 |
| 3,774,768 A | 11/1973 | Turner |
| 3,882,027 A * | 5/1975 | Lunt ............ 210/150 |
| 3,925,206 A * | 12/1975 | Dea ............ 210/170 |
| 3,933,629 A | 1/1976 | Smith |
| 3,950,252 A | 4/1976 | Jordan et al. |
| 3,957,634 A | 5/1976 | Orensten et al. |

(Continued)

FOREIGN PATENT DOCUMENTS

CA 2065350 3/1991

(Continued)

Primary Examiner—Christopher Upton
(74) Attorney, Agent, or Firm—R. Reams Goodloe, Jr.

(57) ABSTRACT

A compact, ground surface mounted wastewater treatment unit module. The module is surface mounted on a selected substrate such as a scarified native soil. A watertight receiving basin is located on the substrate. The basin is at least partially filled with a lower layer of packing media, suitable for support of biological growth, and then with at least a first and a final layer of a porous granular media. A standpipe introduces wastewater to be treated, and such wastewater is distributed to the packing at the lower reaches of the basin. The wastewater flows up through the packing, and into the first layer of a porous granular media, and thence upwardly and outwardly via capillary action and molecular attraction, and ultimately though the final porous granular media. Treated wastewater is either collected or absorbed in an absorption foot interface between the final medium and the native earth below.

67 Claims, 11 Drawing Sheets

U.S. PATENT DOCUMENTS

| | | | |
|---|---|---|---|
| 4,162,976 A | 7/1979 | Monson | |
| 4,169,050 A | 9/1979 | Serfling et al. | |
| 4,211,655 A | 7/1980 | Jordan | |
| 4,218,318 A * | 8/1980 | Niimi et al. | 210/150 |
| 4,251,359 A | 2/1981 | Colwell et al. | |
| 4,293,421 A | 10/1981 | Green | |
| 4,311,593 A | 1/1982 | Benjes et al. | |
| 4,411,780 A | 10/1983 | Suzuki et al. | |
| 4,422,930 A | 12/1983 | Hatanaka | |
| 4,627,917 A | 12/1986 | Morper | |
| 4,664,803 A | 5/1987 | Fuchs et al. | |
| 4,670,148 A | 6/1987 | Schneider | |
| 4,800,021 A | 1/1989 | Desbos | |
| 4,997,568 A | 3/1991 | Vandervelde et al. | |
| 5,043,061 A | 8/1991 | Inagaki | |
| 5,217,616 A | 6/1993 | Sanyal et al. | |
| 5,281,332 A | 1/1994 | Vandervelde et al. | |
| 5,338,131 A | 8/1994 | Bestmann | |
| 5,352,357 A | 10/1994 | Perry | |
| 5,397,474 A | 3/1995 | Henry | |
| 5,478,464 A | 12/1995 | Cyr | |
| 5,480,561 A | 1/1996 | Ball et al. | |
| 5,503,738 A | 4/1996 | DeFilippi et al. | |
| 5,543,039 A * | 8/1996 | Odegaard | 210/150 |
| 5,578,202 A | 11/1996 | Hirane | |
| 5,632,896 A | 5/1997 | Vandervelde et al. | |
| 5,707,513 A | 1/1998 | Jowett et al. | |
| 5,766,454 A | 6/1998 | Cox et al. | |
| 5,766,475 A | 6/1998 | Mayer et al. | |
| 5,893,975 A * | 4/1999 | Eifert | 210/617 |
| 5,958,239 A | 9/1999 | Sing | |
| 5,980,739 A | 11/1999 | Jowett et al. | |
| 5,989,416 A * | 11/1999 | Gorton | 210/151 |
| 6,153,094 A | 11/2000 | Jowett et al. | |
| 6,210,578 B1 | 4/2001 | Sagastume et al. | |
| 6,264,838 B1 | 7/2001 | Nivens, Jr. | |
| 6,283,309 B1 | 9/2001 | Koers | |
| 6,319,403 B1 | 11/2001 | Meyers | |
| 6,319,405 B1 | 11/2001 | Roy et al. | |
| 6,334,958 B1 | 1/2002 | Ruskin | |
| 6,372,137 B1 | 4/2002 | Bounds | |
| 6,428,239 B1 * | 8/2002 | Davis | 210/532.2 |
| 6,428,691 B1 * | 8/2002 | Wofford | 210/151 |
| 6,464,865 B1 * | 10/2002 | Tipton et al. | 210/532.2 |
| 6,531,062 B1 | 3/2003 | Whitehill | |
| 6,540,910 B1 | 4/2003 | Schwarzenegger et al. | |
| 6,569,321 B1 | 5/2003 | Coffman | |

FOREIGN PATENT DOCUMENTS

| | | |
|---|---|---|
| CA | 2073969 | 6/2001 |
| GB | 18216 | 10/1893 |
| JP | 49-19788 | 5/1974 |
| JP | 56-31152 | 7/1981 |
| JP | 57-148498 | 9/1982 |
| JP | 3068645 | 5/2000 |
| WO | WO 91/03429 | 3/1991 |
| WO | WO 91/10624 | 7/1991 |

* cited by examiner

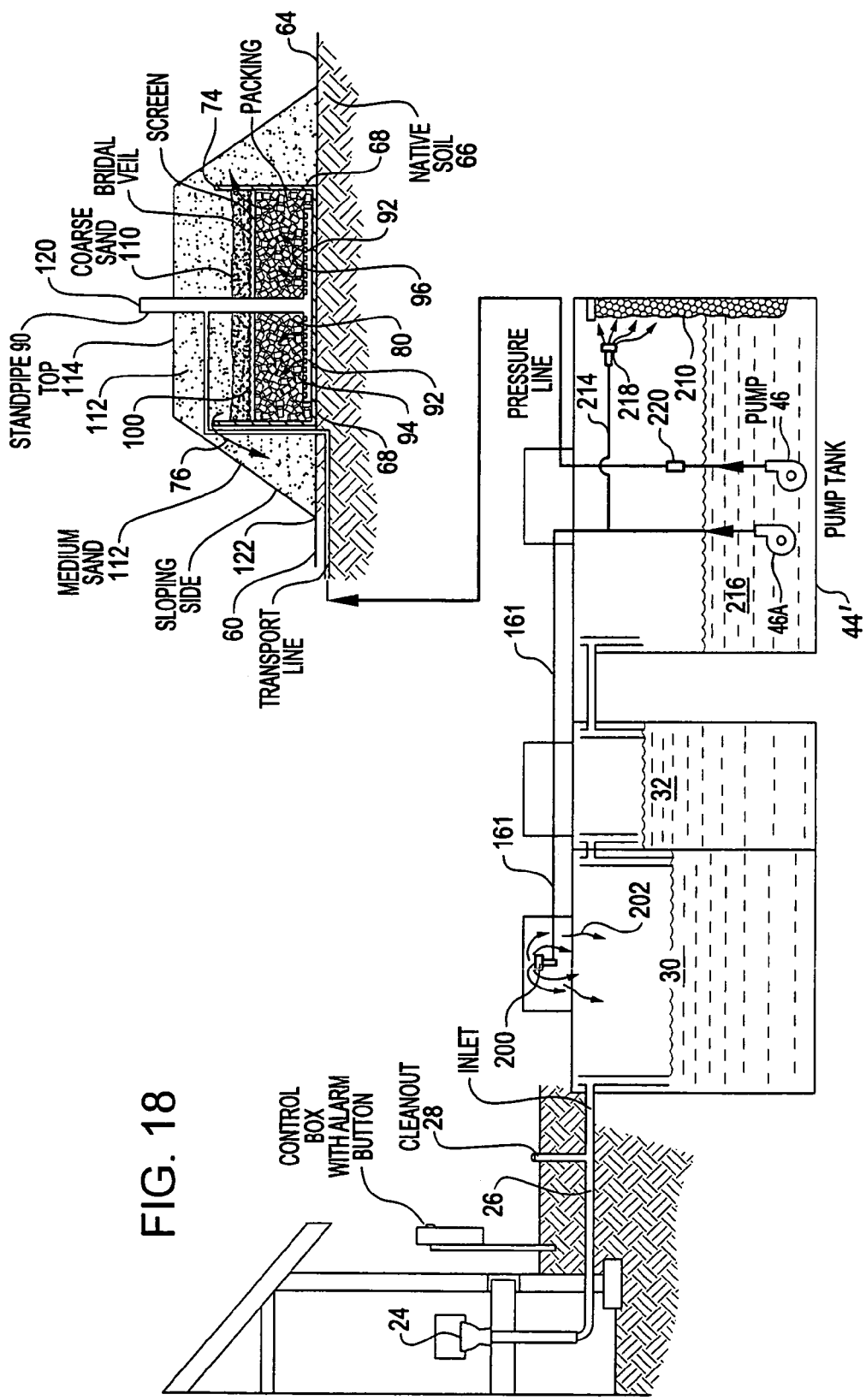

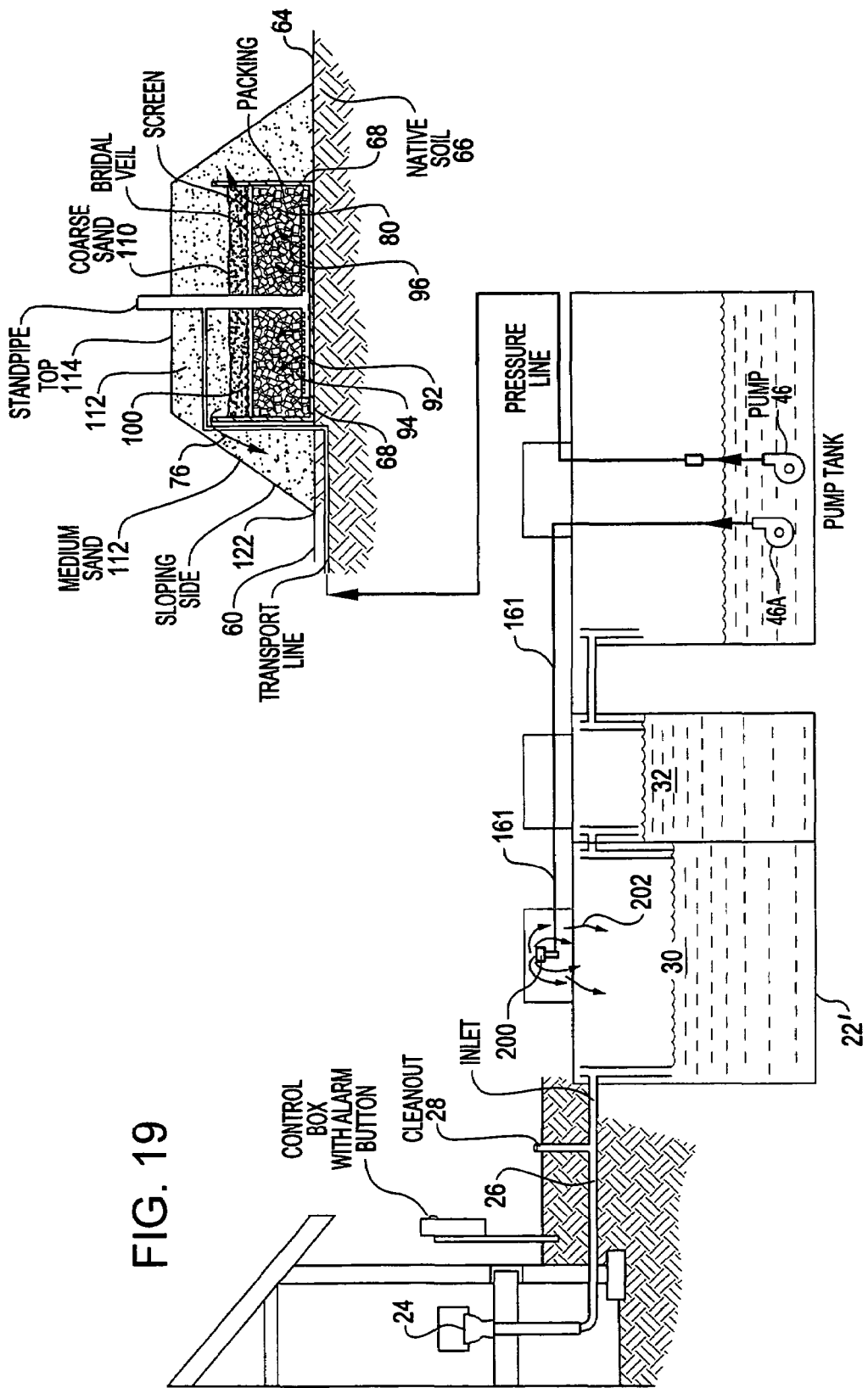

COMPACT SURFACE MOUNTED ON-SITE WASTEWATER TREATMENT UNIT

RELATED PATENT APPLICATIONS

This patent application claims priority from prior U.S. Provisional Patent Application Ser. No. 60/553,819 filed on Mar. 16, 2004, entitled Compact Surface Mounted On-Site Wastewater Treatment Unit, the disclosure of which is incorporated herein in its entirety by this reference.

COPYRIGHT RIGHTS IN THE DRAWING

A portion of the disclosure of this patent document contains material that is subject to copyright protection. The applicant no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to apparatus for the treatment of wastewaters, and in particular, to apparatus for the treatment of wastewaters such as sewage via biological processes in on-site systems.

BACKGROUND

Methods and apparatus for the treatment and purification of wastewaters such as domestic sewage using a biological filter has been taught in my previous patents, namely U.S. Pat. No. 4,997,568, issued Mar. 5, 1991 for a Process and Apparatus for a Biological Reactor to Purify Water, U.S. Pat. No. 5,281,332 issued Jan. 25, 1994 for a System for Treating Sewage or Other Fluids, and U.S. Pat. No. 5,632,896, issued May 27, 1997, for a Method for Treating Sewage and Other Liquids; the disclosures of each one of the just mentioned U.S. patents is incorporated herein in their entirety by this reference. Since the time of development of such devices, however, sewage and waste water disposal requirements have continued to become stricter. And, the need for compact, highly efficient treatment systems at remote or difficult sites has grown, especially as second homes are built at remote locations or difficult site specific issues, such as steep slopes or poor draining soils. Thus, the provision of systems for small scale, on-site sewage treatment has become increasingly important at remote locations which are not served by sewers. This is especially true at locations which are on or adjacent to sensitive areas, or which are located where the native soils are not conducive to installation of traditional drain fields for sewage treatment. Also, in order for traditional on-site septic systems to work well, certain minimum soil and ground water conditions are necessary, and rather large lot sizes are often required. Locations meeting such requirements are becoming less and less available, and even when they are available, they are more and more expensive. Thus, there has been an increasing demand for high performance on-site sewage treatment systems, including for designs such as those which are taught in my prior art patents that were just noted above.

However, during the course of installation and maintenance of my prior art sewage treatment systems, I have noted an increasing and as yet still unmet need for a still more compact high performance on-site sewage treatment system. I have also noted a need for a system which eliminates the need to dig a hole into the native soil in order to install the apparatus. And, in some situations, it would be advantageous for an on on-site wastewater treatment unit to be suitable for relocation to another spot on the same property, or to another piece of land at another location. Moreover, many of the compact aerobic residential on-site sewage treatment systems sold by others have unacceptably low performance, even when relatively new, as shown by various studies such as described by the article entitled "Aerobic Residential Onsite Sewage Systems: An Evaluation of Treated-Effluent Quality," by M. Maxfield, et al, in Journal of Environmental Health, October 2003, pp. 14–19. In that study, in which samples from 184 residences with on-site sewage treatment systems were tested (and in which seventy seven percent (77%) of the units were less than one year old), it was shown that over a third of the three common brand name units installed, namely Multi-Flo™, NorweCo™, and Whitewater™ brand systems, failed to meet the National Sanitary Foundation (NSF) certification standards for biological oxygen demand ($BOD_5$) and total suspended solids (TSS) in the treated effluent. And, over two-thirds of the systems failed to meet the Washington State Board of Health Treatment Standard 2 for $BOD_5$ and TSS. Furthermore, an average of 59% of the systems failed to meet Washington State standards for fecal coliform in the treated effluent. Consequently, there still remains an as yet unmet need for a compact, high performance on-site wastewater treatment apparatus which produces nearly undetectable levels of the common sewage contamination parameters including odor, fecal coliform bacteria, biological oxygen demand, and total suspended solids, and which produces a purified water product that can be disposed of without concern for human contact or environmental pollution.

BRIEF DESCRIPTION OF THE DRAWING

In order to enable the reader to attain a more complete appreciation of the invention, and of the novel features and the advantages thereof, attention is directed to the following detailed description when considered in connection with the accompanying figures of the drawing, wherein.

Figure 5:
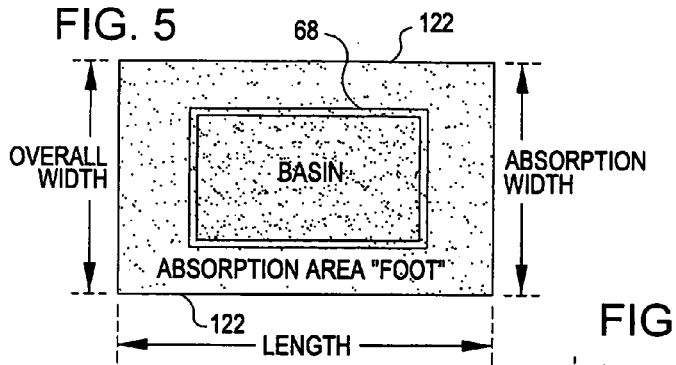
FIGS. 5 and 6 show how the final treatment module is situated in essentially level ground, i.e., locations in which the ground slopes from about 0 to about 5%, wherein the entire area below the outer media layer and external to the basin is available as an absorption foot.

First, FIG. 5 provides a plan view footprint of the basin as mounted on-site at the surface above a scarified native soil, and illustrates use of a suitable sand to provide an absorption footprint extending outwardly from the basin along an absorption length and an absorption width, to provide a selected absorption area, which absorption area is equal to the absorption width times the absorption length, less the basin width times the basin length.

Figure 6:
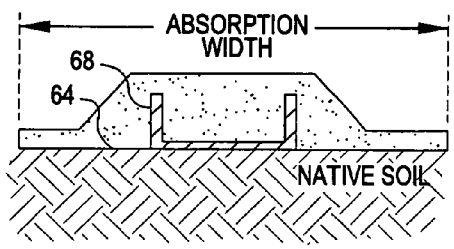

Next, FIG. 6 provides a vertical cross-section view of the basin just illustrated in FIG. 5, when the final wastewater treatment unit is surface mounted on native soil, showing the use of a suitable sand on native soil to provide an absorption width below the basin and mound.

Figure 7:
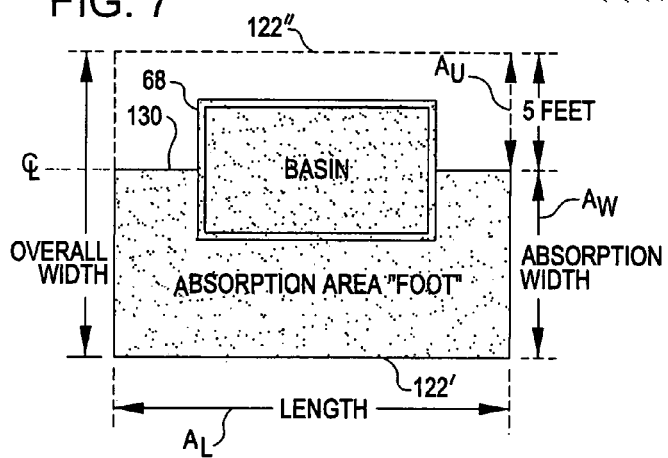
Figure 8:
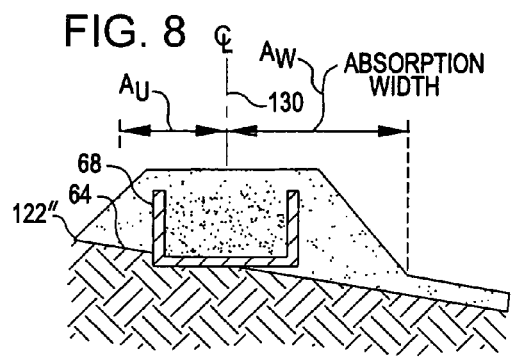

FIGS. 7 and 8 show how the final wastewater treatment module is situated in sloping ground, i.e., locations in which the ground slopes from about 5% to about 20%.

FIG. 7 provides a plan view footprint of the final wastewater treatment unit including a basin as mounted on native soil in sloping ground, and illustrates use of a suitable sand to provide an absorption footprint extending outwardly, both downhill from the basin along an absorption length and for an additional five feet in the uphill direction, and along an absorption width, to provide a selected absorption area.

Next, FIG. 8 provides a vertical cross-section view of the final wastewater treatment unit and basin as just shown in FIG. 7, with the basin surface mounted in a sloping location in native soil, showing how the basin is lodged on the slope, and also showing the use of a suitable sand on native soil to provide an absorption area.

Figure 9:
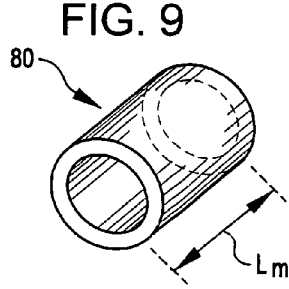

FIG. 9 is a perspective view of one embodiment of a suitable packing for the final treatment module, which in one embodiment can be provided in one-half inch long sections of thin wall plastic pipe such as polyvinyl chloride (PVC) or the like.

Figure 10:
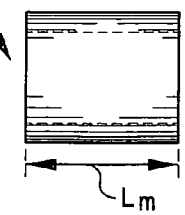

FIG. 10 is a side view of the packing just illustrated in FIG. 9.

Figure 11:
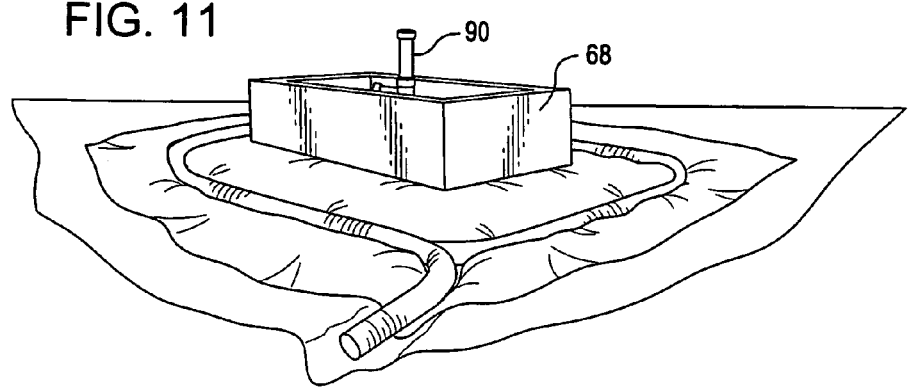

FIG. 11 is a perspective view of one embodiment of the final wastewater treatment module for a compact surface mounted wastewater treatment system during construction, when utilizing an impervious liner below the basin and an external collection pipe, such as may be used for collection of the treated effluent for reuse.

Figure 12:
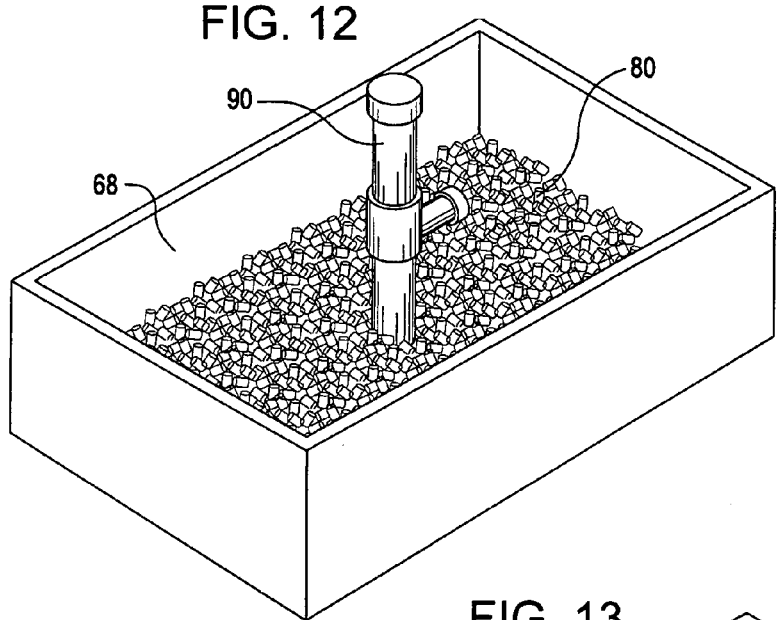

FIG. 12 is a perspective view of one embodiment of a final wastewater treatment module during system construction, showing the basin after having been filled to the extent described for one embodiment herein with a suitable packing such as that of the type shown in FIG. 9, for biological treatment of the wastewater.

Figure 13:
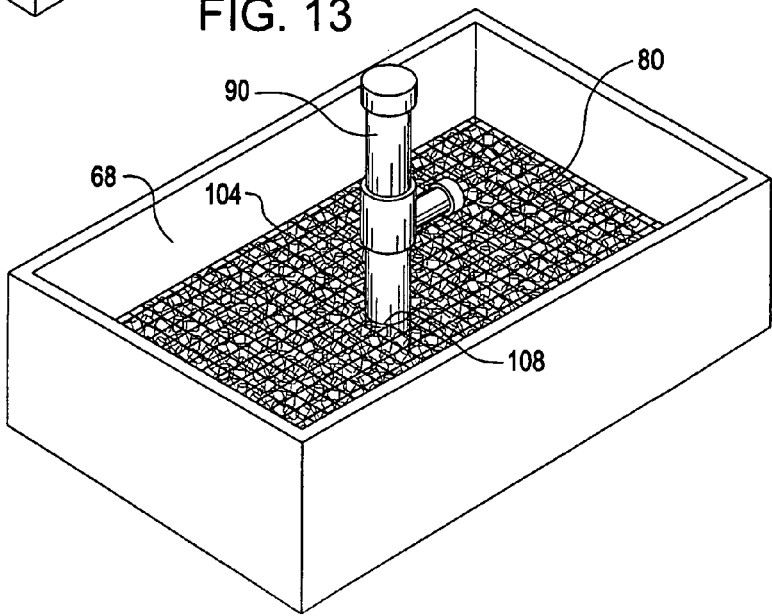

FIG. 13 is a perspective view similar to that just shown in FIG. 12 above, but now showing the addition of a first screen layer, such as may be provided by a "window screen" size of screening synthetic fabric.

Figure 14:
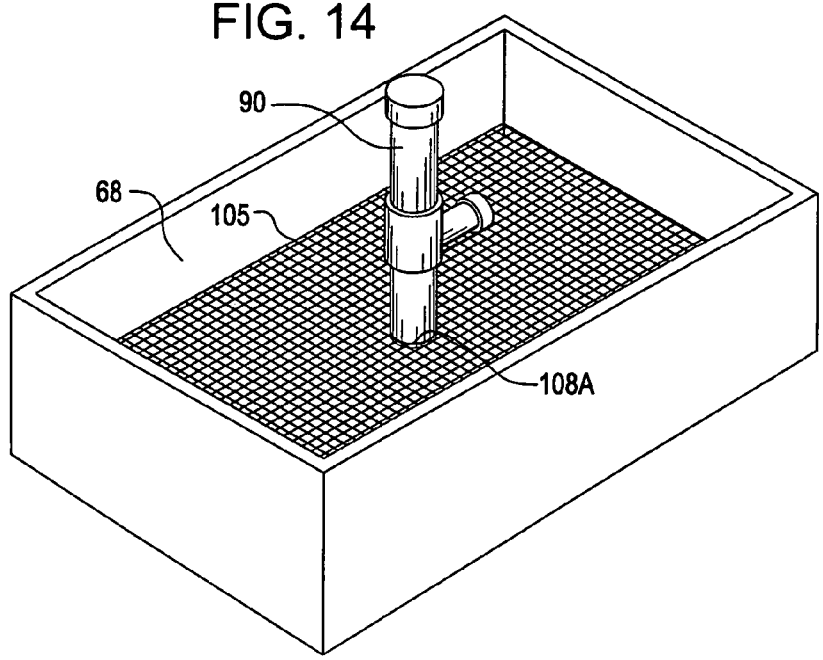

FIG. 14 is a perspective view similar to that just shown in FIGS. 12 and 13, but now showing the addition of a second screen layer, such as may be provided by a "bridal veil" size of screening synthetic fabric, which second screen layer is sufficiently small in size so as to substantially prevent the migration of the first media layer, such as a coarse sand, downward through the second screen layer.

Figure 15:
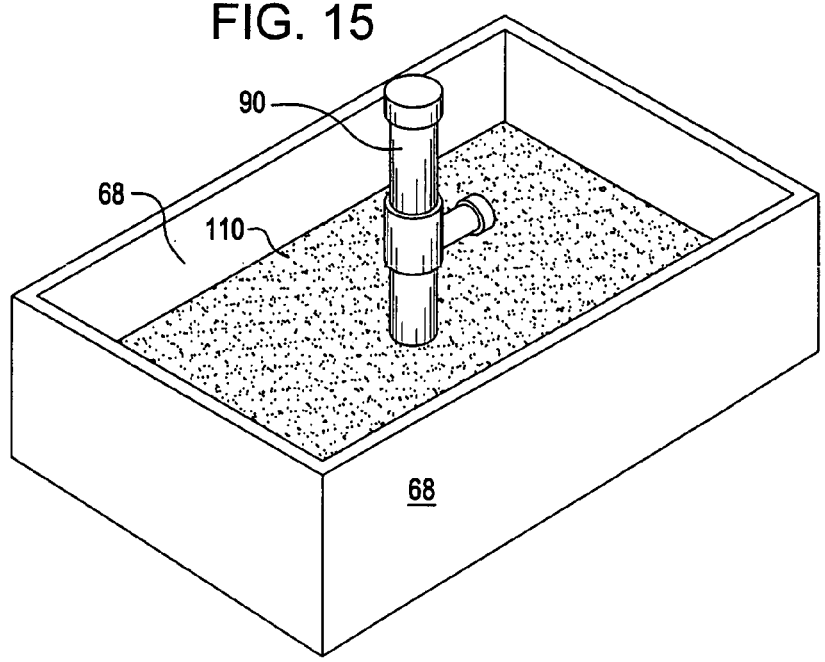

FIG. 15 is a perspective view similar to those shown in FIGS. 12, 13, and 14, now showing the addition of the first media layer of coarse sand which has in this embodiment been added above the second screen layer.

Figure 4:
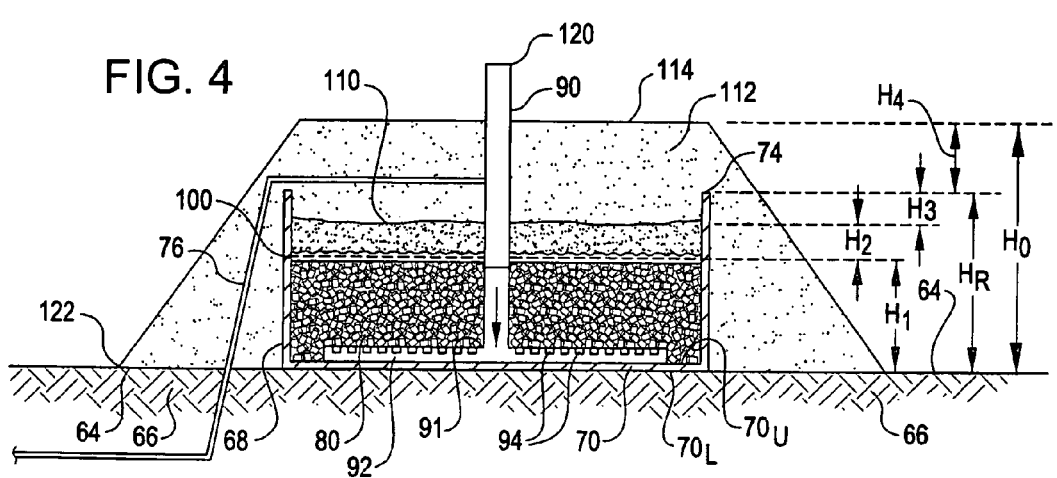
FIG. 4 is an enlarged vertical cross-sectional view, similar to that first shown in FIG. 2, but now showing in detail the path of wastewater through the compact surface mounted final wastewater treatment module, from the inlet transport line, to the standpipe for receiving wastewater to be treated, to the distribution pipe situated in the basin and connected to the standpipe for receiving and distributing wastewater to be treated, to the packing in the basin for allowing biological treatment, through the first or coarse screen above the packing in the basin, then upward through the second or fine screen above the coarse screen, then upward through a first media layer which in one embodiment is provided by way of a coarse sand, and then upward within the basin through a second media layer which in one embodiment is provided by way of a medium sand, then upward and outward over the rim of the basin and thence through at least one media layer to an outer layer, which in one embodiment can be provided by further addition of a medium sand to and above the second media layer, and then further outwardly and downwardly through the at least one outer media layer, and thence through an absorption foot and into the native soil below.
Figure 16:
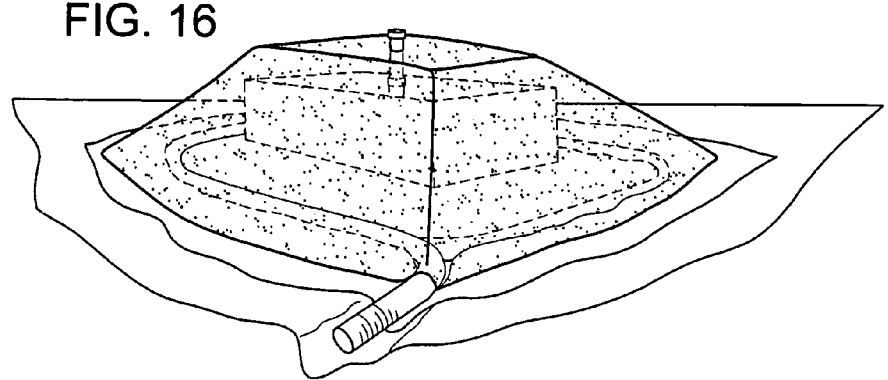

FIG. 16 is a perspective view of a finished surface mounted on-site final wastewater treatment module, showing how the final media layer is provided upward and outward from the basis to provide for transport of treated effluent upward from the basin and thence downward and outward toward either a collection system as first illustrated in FIG. 11 above, or to an absorption foot in contact with native earth, as illustrated in FIG. 4 above.

Figure 17:
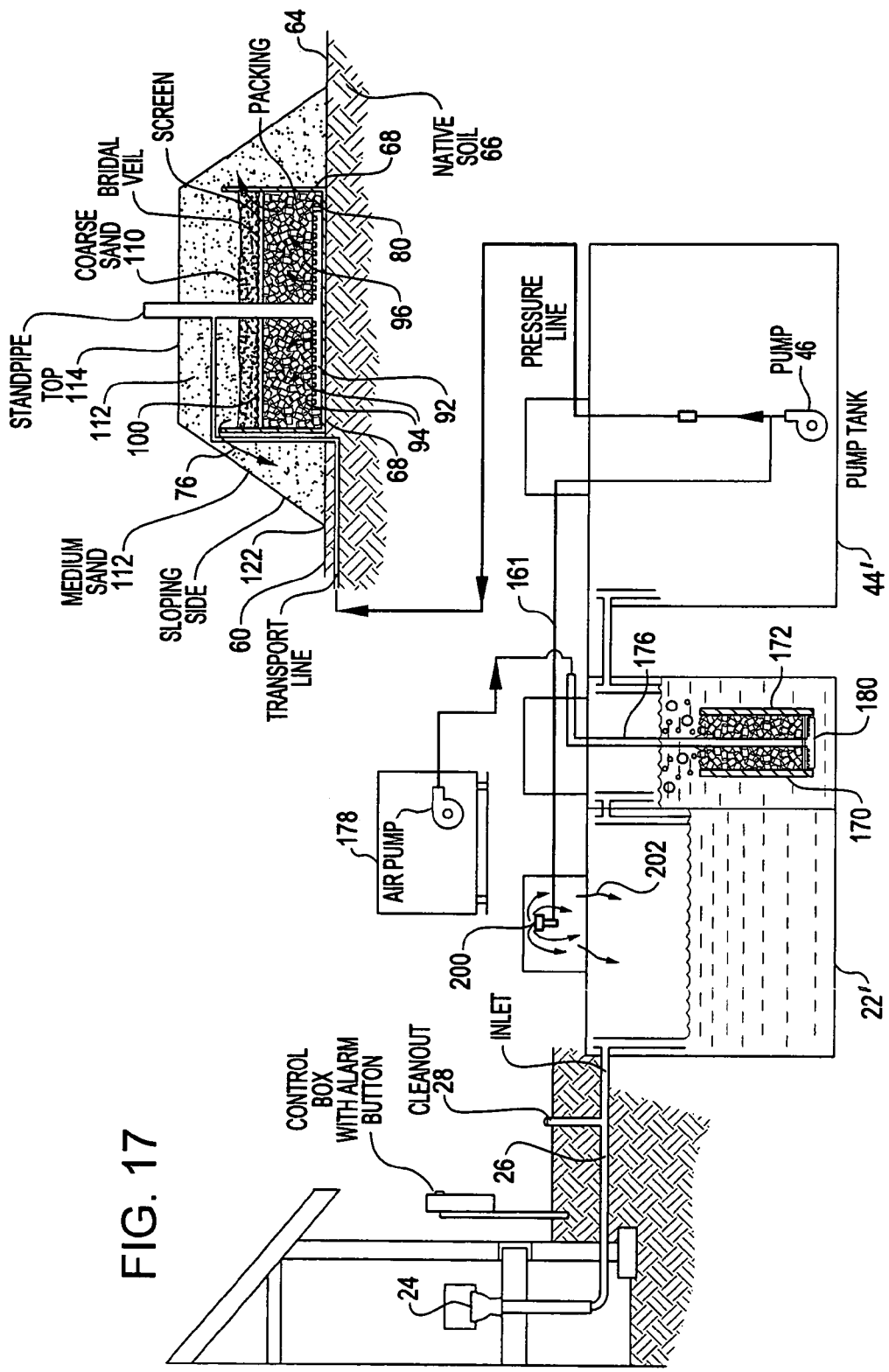

FIGS. 17, 18, and 19 illustrate various embodiments which may be utilized for enhancing the quality of the final treated effluent, especially with respect to reduction of nitrates in the treated effluent.

In FIG. 17, the use of an air bubbling system in the second compartment of a two compartment septic tank is illustrated, wherein a packed bed is provided for upward contact between air bubbles and the effluent being treated.

In FIG. 18, the use of an extended aeration media surface such as a rectangular outdoor rug is shown, wherein the extended aeration media surface is affixed to one or more walls of the pump tank, and wherein a portion of the effluent to be treated is sprayed toward the upper end edge of the extended aeration media surface and is then allowed to trickle toward the bottom of the pump tank.

In FIG. 19, instead of using an extended aeration media surface as just illustrated in FIG. 18, the effluent to be treated is sprayed against one or more sidewalls of the pump tank, and is then allowed to trickle toward the bottom of the pump tank.

Figure 20:
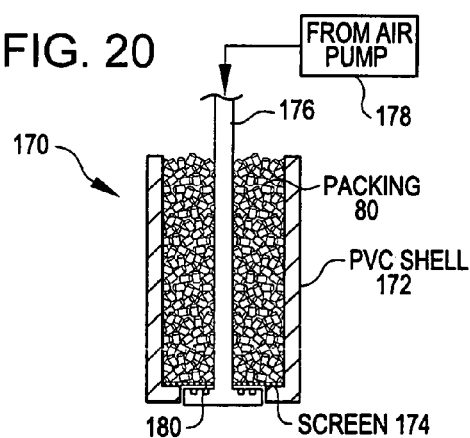

In FIG. 20, the construction details of the packed column treatment device first shown in FIG. 17 above are described, now showing in this embodiment a centrally located air supply tube, which delivers air to an air delivery sparge, and a column housing as may be provided in PVC or other suitable materials.

Figure 21:
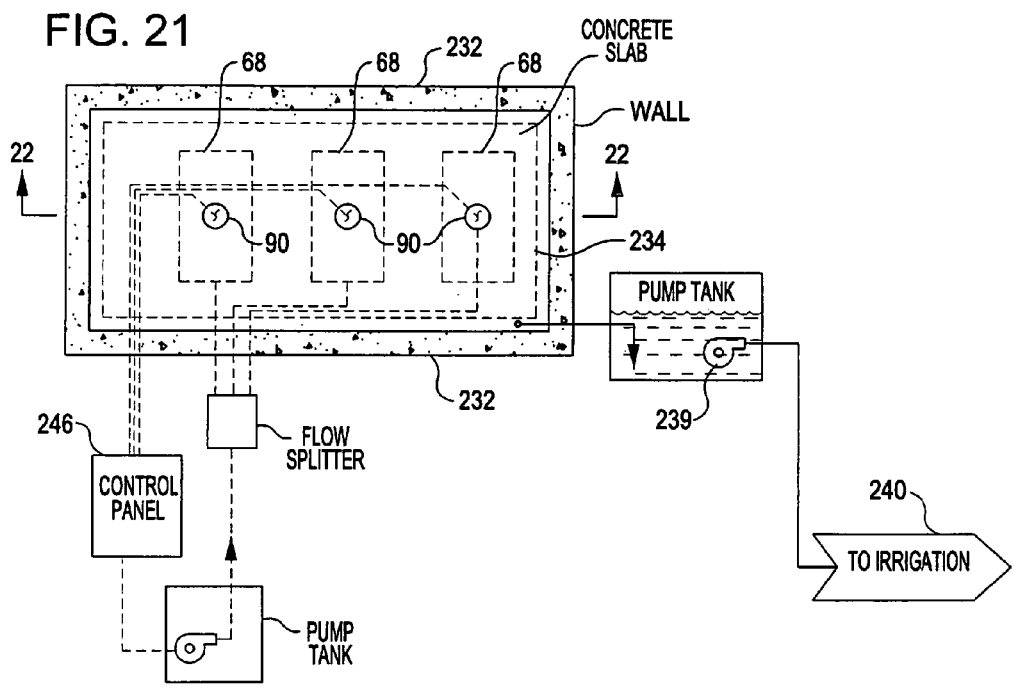

FIG. 21 shows the use of three on-site surface mounted final wastewater treatment units operating in parallel, with the units placed on an impervious concrete slab with internal collection trenches, so that the treated effluent can be collected for reuse, for example, for irrigation service.

Figure 22:
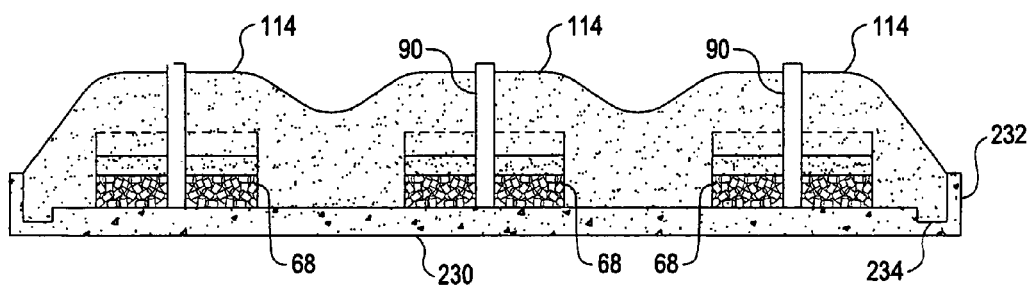

In FIG. 22, a vertical cross section of the three on-site surface mounted final wastewater treatment units just illustrated in FIG. 21 is provided, taken as if looking at section 22—22 of FIG. 21.

Figure 23:
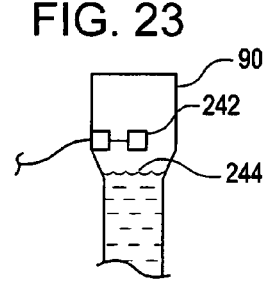

FIG. 23 shows in further detail the use of a high level alarm such as a float in the standpipes just illustrated in FIG. 21.

The foregoing figures, being merely exemplary, contain various elements that may be present or omitted from actual implementations and process configurations of the wastewater treatment apparatus and process system taught herein, depending upon the circumstances. An attempt has been made to draw the figures in a way that illustrates at least those elements that are significant for an understanding of the various embodiments and aspects of the invention. However, various other elements of unique wastewater treatment apparatus are also shown and briefly described to enable the reader to understand how various features, including optional or alternate features, may be utilized in order to provide an highly efficient, high effluent water quality in a compact, on-site, surface mounted wastewater treatment system that can be provided in a desired size and configuration for providing a long lasting and efficiently performing on-site wastewater treatment units.

DETAILED DESCRIPTION

Figure 1:
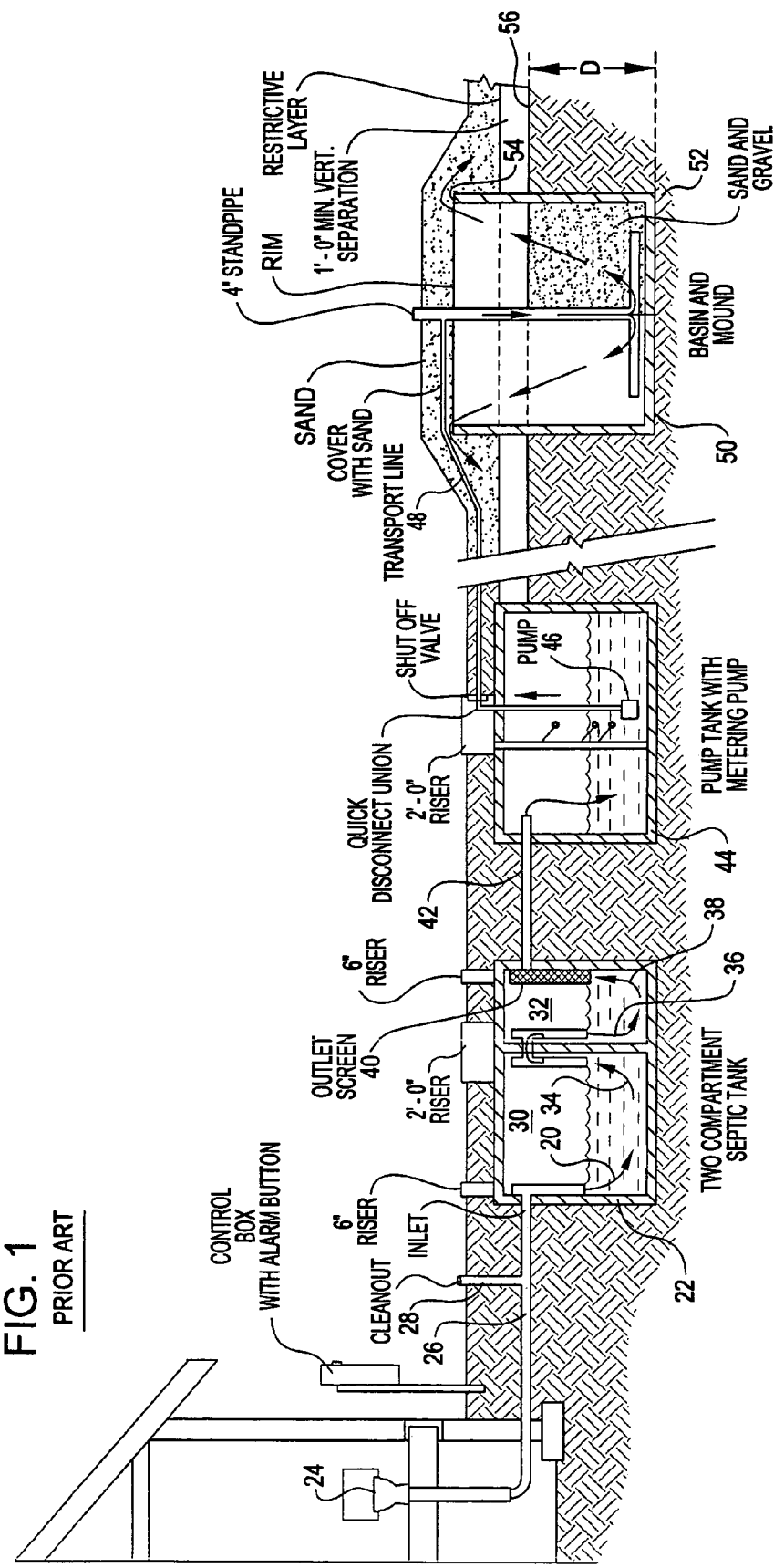
FIG. 1 provides a vertical cross-section view of a prior art on-site wastewater treatment system which generally employs the principles taught by my prior art patents listed above.

An improved apparatus and method for treatment of wastewater, and especially for the on-site treatment of residential, is described and claimed herein. More specifically, the improvement described herein is to a treatment system which uses (1) an septic tank having two compartments, (2) an intermediate pump tank, and (3) a final biological wastewater treatment module which has a very small physical volume per gallon per day of influent wastewater to be treated, while nevertheless providing high quality treated effluent. Referring to FIG. 1, where one prior art system is depicted using the principles disclosed in my prior art patents identified above, a raw wastewater or sewage effluent is discharged (reference arrow 20) into septic tank 22 from indoor fixtures 24 via discharge conduit 26. A conventional cleanout system 28 is normally provided. To enhance performance, septic tank 22 may be provided as a two compartment septic tank having first 30 and second 32 compartments, so that flow (reference arrow 34) exits first compartment 30 and enters (reference arrow 36) the second compartment for treatment. Effluent (reference arrow 38) from the second compartment 32 transits through an outlet screen 40 and passages through septic tank outline line 42 and into pump tank 44. A pump 46 discharges wastewater via transport line 48 to a basin 50. As depicted in this FIG. 1, prior art treatment units included a basin 50 that was recessed a distance D into the ground 52, with the distance D often running in the range of about two feet to about four feet, more or less, depending upon the dimensions of the basin and the treatment system capacity, as well as the soil type. In that prior art design, the rim 54 of the basin 50 must be placed a suitable and variable preselected distance above the receiving surface 56 of the native earth 58. In such prior art systems, the basin 50 has typically been provided with a cement basin having an impermeable liner that prevented leakage of incompletely treated wastewater to the ground 52 below the basin 50. Basins 50 are heavy, not economically transportable or moveable for long distances, and thus, are not suitable for being sold as a package unit for long distance delivery to remote sites.

Figure 2:
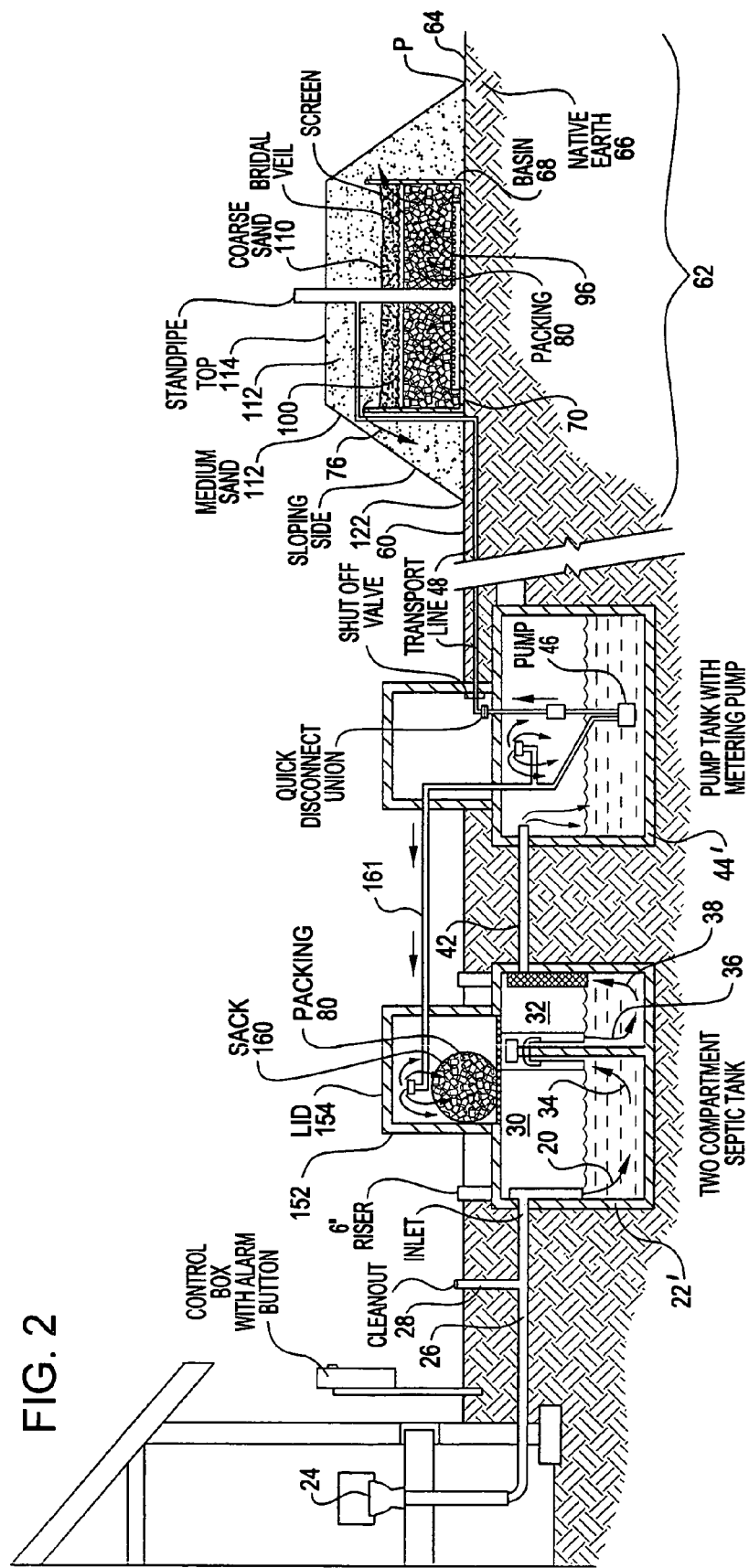
FIG. 2 provides a vertical cross-section view of my new wastewater treatment system, showing modifications and improvements to the septic tank and the pump tank, and also now including a novel surface mounted final wastewater treatment module which incorporates a surface mounted basin, a standpipe for receiving wastewater to be treated, a distribution pipe situated in the basin and connected to the standpipe for receiving and distributing wastewater to be treated, a packing in the basin for allowing biological treatment, a first or coarse screen above the packing in the basin, a second or fine screen above the coarse screen, which coarse screen is suitable for retaining thereabove a coarse sand layer located within the basin, and a medium sand layer in the basin above the coarse sand layer, and additional medium sand extending vertically and laterally beyond the basin so as to provide a sloping outer sidewall along the sides and along the ends of the basin, and where the sloping sidewall extends downward toward and in most suitable situations to the native soil, so that an absorption footprint is provided for transport of the treated wastewater to the native soil.

Turning now to FIG. 2, a novel, compact ground surface 60 mounted final wastewater treatment module 62 has been provided. In addition, improvements have been made in the pretreatment system 63, including the revised septic tank 22' and the revised pump tank 44'. Such a final wastewater treatment module has been mounted on scarified surface 64 of native earth 66. A substantially water impermeable basin 68, which may be provided in concrete similar to basin 50 discussed above, but which in another embodiment may be manufactured of lightweight fiberglass reinforced plastic (FRP) or other suitable plastic or lightweight formable or moldable substance, is provided. As better seen in FIGS. 3 and 4, basin 68 includes a bottom 70 having a lower outer surface $70_L$ and an upper inner surface $70_U$, upwardly extending sidewalls 72, and an upper peripheral rim 74, over which wastewater flows outwardly from the basin in the direction of reference arrows 76 (see FIG. 2). As noted in FIG. 4, the basin 68 has a rim 74 height $H_R$ which may vary above the scarified surface 64 of the native soil 66. In many applications, a low profile height of about 30 inches will be adequate, but of course, the size and height $H_R$ may vary depending upon soil type (i.e, whether the soil is type 1, 2, 3, 4, 5, or 6) in that different soils absorb water at varying rates, so the geometry may be altered accordingly. A plurality of units of at least one mass transfer packing media 80 is provided. Typically, a length $L_M$ (see FIGS. 9 and 10) of one-half inch long sections of one-half inch diameter thin wall PVC (polyvinylchloride) pipe is adequate for such media, but any of one of conventional media, including the raschig ring shape as just noted or one of the variations of similar packing that is suitable for supporting growth of biota and as is known to those of ordinary skill in the art and to which this specification is addressed, may also be utilized to perform the necessary function of providing a surface for growth of biological organisms to proves the wastewater transiting through such media. The packing media 80 provides sites for biological growth without plugging of media 80, so that at least a portion of the organic matter in the wastewater may be consumed by said biological growth. Thus, the medium is provided as packing within the lower portion of basin 68 for a depth $H_1$, as noted in FIG. 4. The selected packing 80 is sized and shaped to comprise a surface area adapted to support the growth of biological organisms thereon, and resulting, when packed together, in a void space within the mass transfer packing 80. This is quite important, as primarily due to the packing 80, I have found such a size and shape advantageous, since the void area is considerably larger than is the case with large gravel packed beds previously utilized in prior art devices. Preferably, the solid volume occupied by the packing 80 itself is less than about 33% of the total volume of space filled by the packing 80, and more preferably, the solid volume occupied by the packing itself is less than about a 15% of the volume occupied by the packing itself, and yet more preferably, the solid volume occupied by the packing itself is less than about 5% of the space filled by the packing 80 itself, or even more preferably less than about 4% of the spaced filled by the packing 80 itself. This void space percentage is a key measure which allows compact unit operation and which is uniquely provided in the present invention. By way of comparison, the prior art system shown in FIG. 1 and discussed above and having a gravel fill in the basin 50 has a basin 50 volume of about 2.2 cubic feet per gallons of influent per day to be treated, whereas in the present invention, the basin 68 has a volume of about 1.0 cubic feet per gallon of influent per day to be treated. Yet, the residence time of influent liquid in the prior art system and in the present invention are comparable, with such residence time being about 1 hour per gallon per day of treatment capacity; the improved treatment module 62 utilizes a residence time of about 120 hours for a capacity of 120 gallons of influent to be treated per day, whereas the prior art configuration illustrated in FIG. 1 utilizes a residence time of about 134 hours for an equivalent 120 gallons of influent per day capacity. In each of the prior art and the improved treatment module 62 designs, the peripheral rim 74 of basins 50 or 68 will allow the treatment modules to provide acceptable treatment of influent wastewater when a rim 74 length of about 1 foot or more is provided for each four gallons per day of influent capacity.

Next, a standpipe 90 usually but not necessarily oriented substantially vertically is provided, and a distributor pipe 92 is provided at the lower end 91 of standpipe 90 and in fluid communication with the standpipe 90, are provided. The standpipe 90 is mounted to downwardly direct wastewater to be treated toward the distributor pipe 92. The distributor pipe 92 is mounted at or just above the upper bottom surface 70$_U$ of the basin 68. The distributor pipe 92 includes a plurality of discharge outlets 94 adapted to discharge wastewater therefrom (see reference arrows 96 in FIG. 2) so that the wastewater 96 reaches the mass transfer packing media 80. For many applications, a four inch size PVC standpipe 90 and a four inch size PVC distributor pipe 92 are sufficient, especially for stand alone single house on-site sewage treatment systems.

Figure 3:
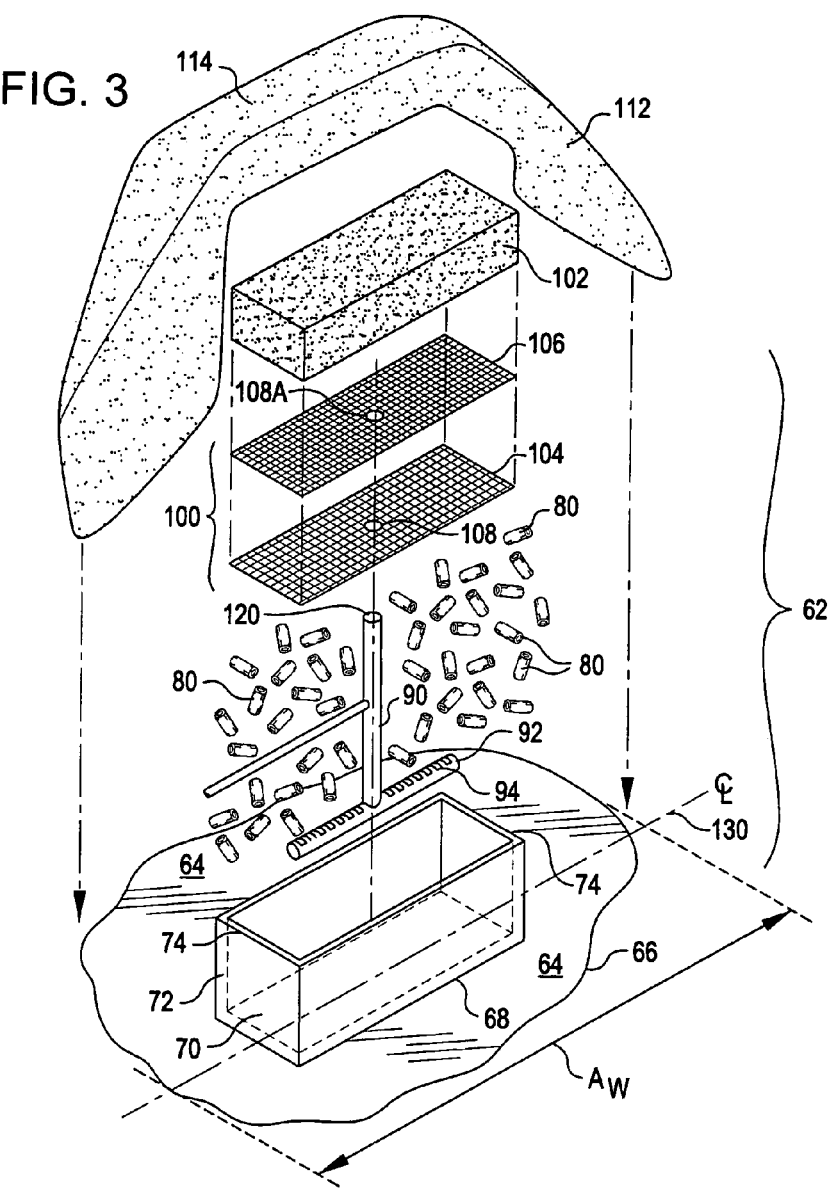
FIG. 3 provides a partial exploded perspective view of some of the elements included in my final surface mounted wastewater treatment module, including a watertight basin having an upper overflow rim, and in this case, wherein the basin is mounted on scarified native soil, and a standpipe for receiving wastewater to be treated, a distribution pipe situated in the basin and connected to the standpipe for receiving and distributing wastewater to be treated, a packing in the basin for allowing biological wastewater treatment, an upper coarse screen above packing in the basin, a fine screen above the upper coarse screen, the fine screen suitable for retaining thereabove a coarse sand layer, then a coarse sand layer above the fine screen and within the basin, and then a medium sand layer in the basin above the coarse sand layer, and additional medium sand extending vertically and laterally beyond the basin so as to provide a sloping outer sidewall along the sides and along the ends of the basin, and where the sloping sidewall extends downward toward and in most suitable situations to the native soil, so that an absorption footprint is provided for transport of the treated wastewater to the native soil.

Mounted above packing 80 and at least substantially covering an area interior to the peripheral rim 74 of the basin 68, at least one screen layer 100 is provided (see FIGS. 3, 13, and 14). The at least one screen layer 100 has, as a minimum the ability to substantially prevent a granular media such as coarse sand 102 of preselected size from downwardly penetrating the at least one screen 100 to reach the mass transfer packing 80, so as to protect the mass transfer packing media 80 against receipt of granular media thereon. In one embodiment, as illustrated in FIG. 3, the at least one screen 100 includes a coarse screen 104 and a fine screen 106. The application of a coarse screen 104 above packing 80 is shown in FIG. 13. As shown in FIG. 14, I have found it advantageous to utilized, as fine screen 106, a "bridal veil" synthetic fabric material, which material is placed over the coarse screen 104 as shown in FIG. 14. Each of the at least one screens 100, or 104 and 106 as may be provided, may include a suitably located central aperture defined by an interior edge line 108 or 108A, respectively, for passage therethrough of standpipe 90, whose outer circumference should be of comparable dimensions to the size of edge line 108 or 108A.

I have also found it advantageous for the compact ground surface mounted upflow aerobic treatment unit 62 as described herein to also include, as shown in FIG. 14, above the at least one screen layer 100, a first granular media 110 of preselected size, which as shown for the embodiment illustrated in FIG. 23 can be coarse sand. Then, as also shown in the embodiment depicted in FIG. 3, a second granular media 112 of a second preselected size is provided; this can be a medium sand, as shown, or alternately might be a fine sand. In any event, there is a first layer of media, usually granular such as sand, and a final layer of media, usually granular such as sand of a selected size. The final, or as depicted in FIG. 3, the second granular media 112 extends upward to a top surface portion 114. The preselected size of each succeeding granular media in a number N (where N is a positive integer) of media layers is, for the embodiments illustrated, smaller than the preselected size of the previous or N−1 media layer. As mentioned above, normally, the first granular media 110 can be made up of coarse sand. In such cases, the second granular media 112 can be provided as medium sand.

Note in FIG. 2 and in FIG. 4 that the standpipe 90 has an upper end 120, and the standpipe 90 extends vertically for a distance sufficient that the upper end 120 extends above the top surface 114 of the final granular media, which is a second media layer of medium sand 112 as depicted in FIGS. 2 and 4. As shown in FIGS. 2 and 4, the final granular media, here, second media 112, extends laterally outwardly from said basin to a peripheral edge portion 122. As shown in FIG. 4, the peripheral edge 122 adjoins scarified surface 64 of the native earth 66. As seen in FIGS. 5, and 6, for systems 62 mounted on flat ground, the peripheral edge 122 defines, inwardly of the peripheral edge, an absorption area or "foot" portion that provides a pathway for treated wastewater to enter the native soil 66 therebelow. In contrast to the prior art system shown in FIG. 1 above, in the present invention, the entire gross absorption area, that is the absorption area $A_L$ times the absorption width $A_W$ is available for infiltration of treated liquid, and no deduction in allowable area need be made for the area occupied on the soil surface by the basin of length $B_L$ and width $B_W$. Thus, while in prior art, the basin 50 was recessed into the earth, the ability to locate the present system on the surface 64 of earth 66 means that gross absorption area can be utilized, rather than net absorption area, for purposes of determining availability of infiltration soil. Also, as seen in FIGS. 7 and 8, when mounted on a sloping location, in prior art, the absorption foot was only be considered to include the area downhill of the centerline 130 of basin 50, whereas with the present invention, an area having a width $A_U$ on the uphill side of basin 68 can additionally be utilized for calculating absorption area.

I believe it to be advantageous, for packaging and transport of the treatment unit 62, before installation, to manufacture the basin 68 in a lightweight, moldable material. In one embodiment, basin 68 can be manufactured in a moldable plastic. In another embodiment, a fiberglass reinforced plastic may be utilized.

Overall, the compact ground surface mounted biological treatment unit 62 described herein is configured for upflow movement of wastewater, such that the wastewater fed to the treatment module 62 ascends from the basin 68 through said first mass transfer media 80, and thence over the peripheral rim 74 of the basin 68, and then into either a second or other selected one of N layers of media such as second granular media 112.

In the case of influent having levels of nitrates which may need additional treatment to attain a desired effluent treatment standard, there are a number of methods for providing such treatment in addition to the process and apparatus already described. Thus, the wastewater treatment system as already described may further include a nitrate treatment step or unit.

As illustrated in FIG. 2, the nitrate treatment unit includes a recycle line 150 from the pump tank 44' to the two compartment septic tank 22'. The two compartment septic tank 22' has a riser 152 with a lid 154 above the first compartment 30 in the septic tank 22'. A water permeable container such as sack 160 having therein a plurality of packing media such as media 80 is provided within the sack 160 in the riser 152. A recycle line 160 provides recycled wastewater from the pump tank 22', and the wastewater is discharged on to the packing media 80 wherein nitrate concentration in treated effluent from said system is reduced such as by way of exposure to air and oxidation directly or indirectly. As noted above, in one embodiment, packing 80 may be provided by way of ½ inch lengths of ½ inch diameter PVC pipe.

The system shown in FIG. 17 provides nitrate treatment unit by way of an air sparged submerged packed column 170 in the second compartment 32 of the two compartment septic tank 22'. As better seen in FIG. 20, the air sparged packed column 170 has, in one embodiment, an outer cylindrical PVC shell 172, a lower retaining screen 174, an air line 176 running from an air pump 178 to a discharge opening 180 located adjacent the lower retaining screen 174, and a plurality of packing media such as media 80 the retaining screen 174 and contained within the PVC shell 172. As illustrated for this embodiment, the packing media 80 is made up of a plurality of packing pieces of ½ inch lengths of ½ inch diameter PVC pipe.

Also, as shown in FIGS. 17 and 18, in one embodiment, a suitable nitrate treatment unit includes a recycle line 160 from the pump tank 44' to a spray nozzle 200 in the riser 152 in the first compartment 30 of the two compartment septic tank 22'. Liquid in line 160 may be supplied by a single pump 46 using a flow splitter 204, or with an independent second pump 46A as seen in FIGS. 18 and 19. The spray nozzle 200 is oriented so as to aerate recycled wastewater 202 discharged from the spray nozzle 200 into the first compartment 20 of the septic tank 22'.

In yet another embodiment shown in FIG. 18, the nitrate treatment unit is provided by way of an extended surface media 210 on at least one interior 212 wall of the pump tank 44'. A recycle line 214 is provided within the pump tank 44'. The recycle line 214 provides wastewater 216 from said pump tank 44' and discharges the wastewater at nozzle 218 on to the extended surface media 216 in the pump tank 44'. An orifice 220 or other suitable flow splitter may be utilized to accomplish the split flow requirement. As illustrated in this embodiment, the extended surface media 210 can be provided in the form of a decomposition resistant outdoor rug.

In those situations normally encountered, the influent to the wastewater treatment system normally includes suspended particulates. The suspended particulates are substantially physically removed from wastewater by a number N (where N is normally two or more) of preselected granular media portions.

More generally, it should be kept in mind when reviewing this specification and the meaning of the claims below that the media 80, whenever used, maybe in the form of a raschig ring or similar packing, and may be provided in short pipe sections. The material for such pipe may be selected from the group consisting of (a) polyvinylchloride, and (b) high density polyethylene. While they have been described as being furnished in shapes and sizes of approximately one-half inch long and in pipe sections are approximately one-half inch in diameter, this is just for reference with respect to performance seen in the experimental test unit which underwent extensive evaluation, and is not intended to limit practice of this claimed invention to this size and shape, but merely for exemplary purposes.

Turning now to FIGS. 21, 22, and 23, it can be seen in FIGS. 21 and 22 that a plurality of wastewater treatment modules 62 can be provided on a common impervious substrate, such as a concrete slab 230, where capture and collection of treated effluent is desired for further discharge or reuse, rather than ground recharge through absorption into native earth. Where collection is practiced, a curb 232 may be provided at the perimeter of slab 230, and collection trenches 234 may be utilized for easy collection of treated effluent for discharge to a pump tank 238, where the treated effluent may be pumped via pump 239 to a desired use such as landscape irrigation 240. A plurality of wastewater treatment modules 62 can be provided using a plurality of basins 68. As shown in FIG. 21, three wastewater treatment modules 68 are provided. And as further detailed in FIG. 23, each basin can include a standpipe 90 having a level sensor 242 for sensing liquid level 244, for providing a control input to control panel 246 and regulate wastewater input rates to the treatment system.

The apparatus described herein is useful in a method of treating wastewater in a compact, on-site treatment system of the type in which wastewater is processed in a septic tank and then in a treatment bed module. Importantly, the process improvement of the development described herein is characterized in that the aerobic treatment process includes providing in one embodiment a watertight basin 68, wherein the watertight basin 68 is situated on a scarified surface 64 of a native soil 66. Water is directed from the septic tank to the standpipe, and thence to the distributor pipe. The wastewater is allowed to move upward through the mass transfer packing media 80 and thence over the peripheral rim 74 of the basin 68. The wastewater is allowed to migrate into the first media portion 110, and thence to a final media portion, which, as depicted in FIG. 2, is media 112, without saturating all of the final media portion 112 with said wastewater. The treated wastewater is allowed to flow from the final media portion 112 into said native soil 66. The wastewater is effectively treated for removal of organic matter, so as to provide a treated wastewater effluent. This is especially borne out by the detailed analytical data of testing shown in TABLE 1. In TABLE 1, it is clearly shown that BOD, Fecal Coliform, TSS, and Ammonia Nitrogen are efficiently and effectively controlled by the compact treatment module 62 described herein. Thus, it can be said that the mass transfer packing medium 80 provides sites for biological growth without plugging of the medium, so that at least a portion of the organic matter in the wastewater may be consumed by said biological growth. As the test data was actual data taken from an on-site residential application, the sewage treatment value is self evident.

Importantly, when using the apparatus and method taught herein, the treated wastewater effluent can be discharged for reuse. Treated wastewater can be absorbed in an absorption foot interface between the final medium and the native earth. For example, the treated wastewater can be directed into the scarified native earth, for recharge of local groundwater. Or, the free liquid can be collected into a storage device for reuse. Alternately, the treated wastewater effluent can be reused for landscape irrigation.

Although the coarse sand, medium sand, and optional fine sand can be of various preselected sizes, those of ordinary skill in the art and to whom this disclosure is directed will be able to effectively evaluate and select the same. For example, in one case, well washed sand with effective particle size <0.80–2.00 mm and a uniformity coefficient <1.5, can be utilized without clogging through a fabric separator or screen 100. Then, a still finer medium washed sand with an effective particle size <0.50–0.60 mm and uniformity coefficient of <1.6 can be used.

Water produced from sewage by this invention has nearly undetectable levels of the common sewage contamination parameters including odor, fecal coliform bacteria, biological oxygen demand and suspended solids. The purified product can then be disposed of without concern for human contact or environmental pollution. It can be reused for household, industrial or irrigation purposes or, discharged safely as normal surface precipitation run-off into storm sewers, ditches, streams or lakes. No separation or setback distances need be provided from wells, surface water, buildings or property lines, nor does it need particular soil or ground water conditions, as do standard systems.

Further details confirming performance of my new system can be appreciated by a review of the test data which was obtained during an extensive on-site test, as well as comparing such data to the performance achieved by prior art systems similar to those described in my earlier patents referenced above. First, in TABLE 1, a summary of Laboratory Results and a statistical analysis is provided for the treatment of an "influent" raw wastewater from a residential site in Poulsbo, Wash. by my new "MODEL M32" wastewater treatment system as described and claimed herein. TABLE 1 also shows the "effluent" treated wastewater discharged from the system. Treatment results for $BOD_5$, TSS, and fecal coliform (CFU) are provided. Second, in TABLE 2, further details of data are provided from testing of my "MODEL M32" as described and claimed herein. Finally, in TABLE 3, performance data is provided from earlier testing of prior art system "MODEL M31" of the type as described in the prior art system depicted in FIG. 1. Importantly, comparable treatment performance is now available in a treatment system which does not require excavation for placement of a basin or similar treatment container; rather, as depicted especially in FIGS. 2 and 4 herein, my new "MODEL M32" system allows placement of the treatment system mound "on grade". This simplifies criteria for location of such systems, and also makes them easier to move in situations where location to new underlying absorption earth is desirable.

Although various aspects and elements of the invention are herein disclosed for illustrative purposes, it is to be understood that the soil surface mounted upflow final wastewater treatment module as described herein is an important improvement in the state of the art of structures and materials for treating wastewater on small, on-site treatment systems. Although only a few exemplary aspects have been described in detail, various details are sufficiently set forth in the figures of the drawing and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided as described herein, and may be embodied in other specific forms without departing from the spirit or essential characteristics thereof. It is especially pointed out that the size, and shape of the basin, and the amount of sand necessary to provide an absorption area of suitable size, will vary widely based on wastewater flow rates to the system and based on ground or soil conditions below the unit and into which the residual treated wastewater is absorbed. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s) is as described herein and as set forth in the appended claims, and as indicated by the drawing and by the foregoing description, is intended to include variations from the embodiments provided which are nevertheless described by the broad interpretation and range properly afforded to the plain meaning of the language of the claims set forth below.

TABLE 1

Summary of Laboratory Results and Statistical Analyses[1], Glendon ® BioFilter Model M32, Poulsbo, WA

|  | $BOD_5$, mg./L | | TSS, mg./L | | Fecal Coliform, CFU | |
| --- | --- | --- | --- | --- | --- | --- |
|  | Influent | Effluent | Influent | Effluent | Influent | Effluent |
| # of Valid Samples/ Range of Samples | 39 | 47 | 40 | 48 | 39 | 48 |
|  | 148–726 | <1–24 | 9–74 | <1–5 | $1.9 \times 10^3$–$1600 \times 10^3$ | <1–402 |
| Average of Samples | 423 | 5.8 | 34.1 | 1.6 | $2.94 \times 10^5$ | 13.4 |
| # of 30 Day Mean Values[2]/ | 35 | 43 | 36 | 44 | 36 | 44 |
| Range of 30 Day Mean Values | 270.5–562.1 | 1.8–21.7 | 20.0–55.8 | 1.0–2.3 | $9.6 \times 10^3$–$922.4 \times 10^3$ | 1.0–34.5 |
| Average of 30 Day Mean Values | 431 | 6.9 | 35.6 | 1.5 | $274.1 \times 10^3$ | 2.9 |
| # of Effluent Mean Values >10/10/200/ # of 30 Day Means |  | 13 of 43 |  | 0 of 44 |  | 0 of 44 |
| Range, Effluent Removal Efficiency, % |  | 95.9–99.7 |  | 82.1–98.6 |  | 99.9–99.9 |
| Effluent Range @ 95% Confidence |  | 4.0–8.0 |  | 1.7–2.3 |  | 0–30.3 |
| Effluent Interquartile Range |  | 2–8 |  | 1–1.6 |  | 1–1 |
| Median, Effluent Interquartile Range |  | 2 |  | 1 |  | 1 |

NOTES:
[1]Lab results preceded by a > or < are treated as the number reported for use in all calculations.
[2]$BOD_5$ and TSS are arithmetic means. Fecal Coliform is geometric mean.

Summary of Testing and Results

A Glendon® BioFilter Model M32 was tested at a residential site in Poulsbo, Wash. from Jul. 10, 2002 through May 8, 2003, a span of 302 calendar days that yielded 48 effluent data days. A summary of the independent third part laboratory's results and statistical analyses derived from these data is presented in Table 1.

TABLE 2

Glendon BioFilter Technologies, Inc.
Model M32, Minder Road Site
Effluent Removal Efficiency and 95% Confidence Analysis GBT/WA DOH Report of M32 Testing
Oct. 16, 2003

| Sample Date | Influent FC CFU × 1,000 | Effluent FC | Removal Efficiency % FC | Influent BOD5 | Effluent BOD5 | Removal Efficiency % BOD5 | Influent TSS | Effluent TSS | Removal Efficiency % TSS |
|---|---|---|---|---|---|---|---|---|---|
| Baseline Test of Influent Prior to M32 Installation | | | | | | | | | |
| May 10, 2002 | | NS | | 528 | NS | | | NS | |
| Jul. 1, 2002 | | | System Startup | | | | | | |
| Jul. 10, 2002 | 48 | 11 | 99.9 | 396 | <1 | 99.7 | 22 | 2.8 | 87.3 |
| Aug. 1, 2002 | <.001* | 402 | — | 426 | 2 | 99.5 | 15 | 1.6 | 89.3 |
| Aug. 5, 2002 | 322 | 146 | 99.9 | 148 | 2 | 98.6 | 24 | <1 | 95.8 |
| Aug. 8, 2002 | >200 | 38 | 99.9 | 234 | <2 | 99.1 | 28 | 5 | 82.1 |
| Aug. 13, 2002 | 1.9 | <2 | 99.9 | 297 | 2 | 99.3 | 30 | 1 | 96.7 |
| Aug. 15, 2002 | 68 | <1 | 99.9 | 393 | <2 | 99.5 | 42 | 1.5 | 96.4 |
| Aug. 20, 2002 | 25 | <1 | 99.9 | 372 | <2 | 99.5 | 34 | 1.2 | 96.5 |
| Aug. 22, 2002 | 46 | <1 | 99.9 | 333 | <2 | 99.4 | 30 | <1 | 96.7 |
| Aug. 27, 2002 | 10 | <1 | 99.9 | 522 | <2 | 99.6 | 21 | 1.6 | 92.4 |
| Sep. 12, 2002 | 80 | <1 | 99.9 | 354 | <2 | 99.4 | 22 | 1 | 95.5 |
| Sep. 26, 2002 | 190 | <1 | 99.9 | 360 | <2 | 99.4 | 32 | 1 | 96.9 |
| Oct. 10, 2002 | 17 | <1 | 99.9 | 435 | <2 | 99.5 | 32 | <1 | 96.9 |
| Oct. 14, 2002 | NS | <1 | — | NS | <2 | — | NS | 3 | — |
| Oct. 18, 2002 | NS | <1 | — | NS | <2 | — | NS | <1 | — |
| Oct. 21, 2002 | NS | <1 | — | NS | <2 | — | NS | <1 | — |
| Oct. 24, 2002 | 8.3 | <1 | 99.9 | 336 | <2 | 99.4 | 35 | 2 | 94.3 |
| Renters Moved Out ~Oct. 30, 2002. New Renters Occupied Nov. 20, 2002 - System Idle for ~20 Days | | | | | | | | | |
| n | 12 | 16 | | 13 | 16 | | 13 | 16 | |
| *Mean | 84683 | 38 | | 354 | 2 | | 28 | 2 | |
| *Std Deviation | 100118 | 104 | | 93 | 0.3 | | 7 | 1 | |
| t @ 95% confidence | 2.201 | 2.131 | | 2.179 | 2.131 | | 2.179 | 2.131 | |
| Lower Bound | 21.071 | −17.406 | | 298 | 1.84 | | 23.771 | 1.467 | |
| Upper Bound | 148.295 | 93.406 | | 410 | 2.16 | | 28.229 | 2.553 | |
| Nov. 26, 2002 | 11 | <1 | 99.9 | 471 | 5 | 98.9 | 9 | <1 | 88.9 |
| Dec. 3, 2002 | NS | <1 | — | NS | 19 | — | NS | <1 | — |
| Dec. 5, 2002 | NS | <1 | — | NS | Invalid | — | NS | <1 | — |
| Dec. 10, 2002 | 210 | <1 | 99.9 | 423 | 16 | 96.2 | 19 | 1 | 94.7 |
| Dec. 12, 2002 | NS | <1 | — | NS | 14 | — | NS | 5 | — |
| Dec. 17, 2002 | NS | <1 | — | NS | 15 | — | NS | 1.5 | — |
| Dec. 19, 2002 | 410 | <1 | 99.9 | 423 | 9 | 97.9 | 17 | 1 | 94.1 |
| Dec. 26, 2002 | NS | <1 | — | NS | 8 | — | NS | 2 | — |
| Jan. 2, 2003 | 1600 | <1 | 99.9 | 330 | 7 | 97.9 | 33 | 4 | 87.9 |
| Jan. 9, 2003 | 800 | <1 | 99.9 | 327 | 8 | 97.6 | 37 | <1 | 97.3 |
| Jan. 14, 2003 | 1060 | <1 | 99.9 | 642 | <2 | 99.7 | 39 | 1 | 97.4 |
| Jan. 17, 2003 | 1200 | <1 | 99.9 | 480 | <2 | 99.6 | 37 | <1 | 97.3 |
| ~Jan. 20, 2003 | | | Shutdown/Simulate Two Week Vacation | | | | | | |
| n cumulative | 19 | 28 | | 20 | 27 | | 20 | 28 | |
| *Mean | 331958 | 22 | | 385 | 5 | | 28 | 2 | |
| *Std Deviation | 476008 | 80 | | 105 | 5 | | 9 | 1 | |
| t @ 95% confidence | 2.101 | 2.052 | | 2.093 | 2.056 | | 2.093 | 2.052 | |
| Lower Bound | 102.526 | −9.02 | | 336 | 3.022 | | 24 | 1.612 | |
| Upper Bound | 561.389 | 53.02 | | 434 | 6.978 | | 32 | 2.338 | |
| ~Feb. 6, 2003 | | | | Resume Flow | | | | | |
| Feb. 12, 2003 | 660 | 1 | 99.9 | 585 | 24 | 95.9 | 74 | 3 | 95.9 |
| Feb. 18, 2003 | 450 | <1 | 99.9 | 594 | 24 | 96 | 41 | <1 | 97.6 |
| Feb. 20, 2003 | 600 | <1 | 99.9 | 573 | 20 | 96.5 | 47 | <1 | 97.9 |
| Feb. 25, 2003 | 660 | <1 | 99.9 | 555 | 2 | 99.6 | 65 | <1 | 98.5 |
| Feb. 28, 2003 | 270 | <1 | 99.9 | 315 | 8 | 97.5 | 47 | <1 | 97.9 |
| Mar. 3, 2003 | | | | Renters Moved Out | | | | | |
| Mar. 4, 2003 | 116 | 1 | 99.9 | 669 | 18 | 97.3 | 61 | 1 | 98.4 |
| Mar. 6, 2003 | 400 | <1 | 99.9 | 726 | 16 | 97.8 | 74 | <1 | 98.6 |
| n cumulative | 26 | 35 | | 27 | 34 | | 27 | 35 | |

TABLE 2-continued

Glendon BioFilter Technologies, Inc.
Model M32, Minder Road Site
Effluent Removal Efficiency and 95% Confidence Analysis GBT/WA DOH Report of M32 Testing
Oct. 16, 2003

| Sample Date | Influent FC CFU × 1,000 | Effluent FC | Removal Efficiency % FC | Influent BOD5 | Effluent BOD5 | Removal Efficiency % BOD5 | Influent TSS | Effluent TSS | Removal Efficiency % TSS |
|---|---|---|---|---|---|---|---|---|---|
| *Mean | 363969 | 18 | | 434 | 7 | | 36 | 2 | |
| *Std Deviation | 419903 | 71 | | 138 | 7 | | 17 | 1 | |
| t or Z @ 95% confidence | 2.060 | 1.96 | | 2.056 | 1.96 | | 2.056 | 1.96 | |
| Lower Bound | 194.328 | −5.523 | | 379 | 4.647 | | 29 | 1.669 | |
| Upper Bound | 533.610 | 41.523 | | 489 | 9.353 | | 43 | 2.331 | |
| Mar. 29, 2003 | | | New Renters Occupied House - System Idle for ~26 Days | | | | | | |
| Apr. 7, 2003 | 360 | <1 | 99.9 | NS | <2 | — | 38 | 1 | 97.4 |
| Apr. 10, 2003 | 360 | <1 | 99.9 | 360 | 2 | 99.4 | 31 | <1 | 96.8 |
| Apr. 15, 2003 | 130 | <1 | 99.9 | 312 | <2 | 99.4 | 23 | 2 | 91.3 |
| Apr. 17, 2003 | 70 | <1 | 99.9 | 591 | <2 | 99.7 | 34 | <1 | 97.1 |
| Apr. 21, 2003 | 60 | <1 | 99.9 | 336 | <2 | 99.4 | 30 | 4 | 86.7 |
| Apr. 23, 2003 | 40 | <1 | 99.9 | 357 | <2 | 99.4 | 35 | 3 | 86.6 |
| Apr. 24, 2003 | 10 | <1 | 99.9 | 423 | <2 | 99.5 | 30 | <1 | 96.7 |
| Apr. 28, 2003 | 40 | <1 | 99.9 | 417 | <2 | 99.5 | 39 | 1 | 97.4 |
| Apr. 30, 2003 | 420 | <1 | 99.9 | 267 | <2 | 99.2 | 27 | 1 | 96.3 |
| May 1, 2003 | 420 | <1 | 99.9 | 492 | <2 | 99.6 | 26 | <1 | 96.2 |
| May 5, 2003 | 36 | <1 | 99.9 | 429 | <2 | 99.5 | 22 | 1 | 95.5 |
| May 7, 2003 | 28 | <1 | 99.9 | 327 | <2 | 99.4 | 34 | 1 | 97.1 |
| May 8, 2003 | 25 | <1 | | 456 | <2 | 99.6 | 28 | <1 | 96.4 |
| | | | End of Testing | | | | | | |
| n cumulative | 39 | 48 | | 39 | 47 | | 40 | 48 | |
| *Mean | 293903 | 13 | | 423 | 6 | | 34 | 2 | |
| *Std Deviation | 367313 | 61 | | 125 | 7 | | 14 | 1 | |
| Z @ 95% confidence | 1.960 | 1.96 | | 1.96 | 1.96 | | 1.96 | 1.96 | |
| Lower Bound | 178.621 | −4.258 | | 384 | 3.999 | | 30 | 1.717 | |
| Upper Bound | 409.185 | 30.257 | | 462 | 8.001 | | 38 | 2.283 | |

NOTES ON STATISTICAL ANALYSIS
For simplicity, all Mean Values have been rounded to the nearest integer.
For sample sizes less than 30, t is used. The t value is based on n − 1 degrees of freedom. Z is used for sample sizes equal to or greater than 30. At 95% confidence level, both t and Z contain 0.025 in each tail.
Confidence interval = $y_{bar}$ + or − [t or Z] $(s/n^{1/2})$, where $y_{bar}$ is the sample mean; s is the sample standard deviation [the sum of the squared deviations divided by (n − 1)], and $n^{1/2}$ is the square root of the number of samples.
All Lower Bound values that are minus (−) are interpreted as a lower bound of zero (0).

TABLE 3

GLENDON BIOFILTER TECHNOLOGIES, Inc.
Modular BioFilter, Model M31
Statistical Analysis GBT/WA DOH Report of M32 Testing,
Oct. 16, 2003

| Date | Influent FC CFU × 1,000 | Effluent FC CFU | Removal Efficiency % FC | Influent BOD ppm | Effluent BOD ppm | Removal Efficiency % BOD | Influent TSS ppm | Effluent TSS ppm | Removal Efficiency % TSS |
|---|---|---|---|---|---|---|---|---|---|
| Nov. 28, 1995 | | 13 | | | 20 | | | 14.4 | |
| Nov. 30, 1995 | | 14 | | 180 | 12 | | | 17.2 | |
| Dec. 5, 1995 | | 10 | | | 11 | | | 6.6 | |
| Dec. 7, 1995 | | 9 | | | 12 | | | 2.8 | |
| Dec. 12, 1995 | | 80 | | | <4 | | | 39.7 | |
| Dec. 19, 1995 | | 20 | | | <5 | | | 9.1 | |
| Dec. 21, 1995 | >200 | 36 | 99.982% | 200 | 4 | 98.000% | 60.7 | 3.3 | 94.563% |
| Dec. 28, 1995 | | 6 | | | 4 | | | 2.3 | |
| Dec. 28, 1995 | 360 | 4 | 100% | NR** | | | 66.7 | 5.2 | 92.20% |
| Jan. 2, 1996 | | 14 | | | 3 | | | 5 | |
| Jan. 4, 1996 | 250 | 11 | 99.996% | 200 | <3 | 98.500% | 39 | 5.2 | 88.667% |
| Jan. 9, 1996 | | 12 | | | <3 | | | 6.6 | |
| Jan. 11, 1996 | | 2 | | | <3 | | | 6.4 | |
| Jan. 16, 1996 | | 8 | | | <3 | | | 4.6 | |
| Jan. 18, 1996 | 244 | 12 | 99.995% | 190 | <5 | 97.368% | 75 | <0.2 | 99.733% |

TABLE 3-continued

GLENDON BIOFILTER TECHNOLOGIES, Inc.
Modular BioFilter, Model M31
Statistical Analysis GBT/WA DOH Report of M32 Testing, Oct. 16, 2003

| Date | Influent FC CFU × 1,000 | Effluent FC CFU | Removal Efficiency % FC | Influent BOD ppm | Effluent BOD ppm | Removal Efficiency % BOD | Influent TSS ppm | Effluent TSS ppm | Removal Efficiency % TSS |
|---|---|---|---|---|---|---|---|---|---|
| Jan. 23, 1996 | | 12 | | | <3 | | | 5 | |
| Jan. 25, 1996 | | 3 | | | <3 | | | 2.6 | |
| Jan. 30, 1996 | | 4 | | | <3 | | | 0.6 | |
| Feb. 1, 1996 | | 4 | | | <3 | | | 0.2 | |
| Feb. 6, 1996 | | 8 | | | <3 | | | 11.5 | |
| Feb. 8, 1996 | | 12 | | | <3 | | | 7.4 | |
| Feb. 13, 1996 | | 1 | | | <3 | | | 3.8 | |
| Feb. 20, 1996 | 990 | 6 | 99.999% | 180 | <4 | 97.777% | 34 | 5 | 85.294% |
| Feb. 22, 1996 | | 0 | | | <4 | | | 3.4 | |
| Feb. 27, 1996 | | 2 | | | <4 | | | 0.4 | |
| Feb. 29, 1996 | 770 | 2 | | 160 | <3 | 98.125% | 28 | 0.2 | 99.286% |
| Mar. 5, 1996 | | 2 | | | <3 | | | 0.8 | |
| Mar. 7, 1996 | 700 | 0 | 100% | 310 | <3 | 99.03% | 34 | 0.8 | 97.647% |
| Mar. 12, 1996 | | 0 | | | <3 | | | 1.4 | |
| Mar. 14, 1996 | | 6 | | | 2 | | | 1 | |
| Mar. 19, 1996 | | 0 | | | <3 | | | 0.6 | |
| Mar. 21, 1996 | | 2 | | | <3 | | | <0.3 | |
| Mar. 26, 1996 | | 6 | | | 5 | | | 1.4 | |
| Mar. 28, 1996 | 253 | 4 | 99.998% | NR** | NR** | | 57 | 1 | 98.246% |
| Apr. 2, 1996 | | 1 | | | <3 | | | 1 | |
| Apr. 4, 1996 | | 0 | | | <3 | | | 1.1 | |
| Apr. 9, 1996 | | 0 | | | <3 | | | 1 | |
| Apr. 11, 1996 | 680 | 0 | 100% | 180 | <3 | 98.33% | 45 | <0.2 | 95.555% |
| n | | 38 | | | 36 | | | 38 | |
| Mean | | 8.57 | | | 4.56 | | | 4.72 | |
| Std Deviation | | 13.857 | | | 3.605 | | | 7.07 | |
| Z @ 95% confidence | | 1.96 | | | 1.96 | | | 1.96 | |
| Lower Bound | | 4.17 | | | 3.38 | | | 2.47 | |
| Upper Bound | | 12.99 | | | 5.74 | | | 6.97 | |
| Apr. 14–27, 1996 | | | | Two Week Shutdown | | | | | |
| Apr. 28, 1996 | | | | Resumed Influent Flow | | | | | |
| Apr. 30, 1996 | | 0 | | | <4 | | | 8 | |
| May 2, 1996 | 1320 | 0 | 100% | 160 | <4 | 97.50% | 69 | 7.2 | |
| May 7, 1996 | | 1 | | | <3 | | | 1.8 | |
| May 9, 1996 | | 0 | | | <4 | | | 0.8 | |
| May 14, 1996 | | 2 | | | <4 | | | 1.8 | |
| May 16, 1996 | | 0 | | | <4 | | | 1.8 | |
| May 21, 1996 | 9200 | 6 | 100% | 200 | <4 | 98.00% | 66 | 2 | |
| May 23, 1996 | | 0 | | | <4 | | | 2 | |
| May 25, 1996 | | | | | | | | | |
| All Samples | | | | | | | | | |
| n | | 46 | | | 44 | | | 46 | |
| Mean | | 7.82 | | | 4.43 | | | 4.26 | |
| Std Deviation | | 12.91 | | | 3.27 | | | 6.5 | |
| Z @ 95% confidence | | 1.96 | | | 1.96 | | | 1.96 | |
| Lower Bound | | 3.55 | | | 3.46 | | | 2.38 | |
| Upper Bound | | 11.01 | | | 5.40 | | | 8.14 | |

Notes:
Lab results preceded by a > or < are treated as the number reported for use in all calculations.
NR**—Not Reported

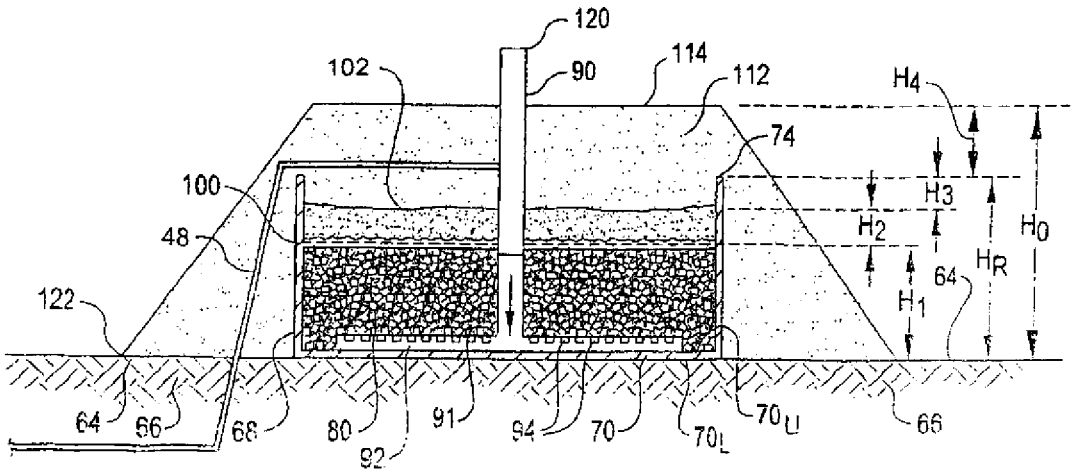

The invention claimed is:

1. A wastewater treatment module for treating contaminated wastewater in a biologically active treatment bed, said apparatus comprising:

(a) a substantially watertight basin, said basin having an outer bottom surface adapted for placement on a substrate, an inner bottom surface, and upwardly extending sidewalls, and a peripheral rim having a selected elevation above said bottom, said basin having a selected containment volume V;

(b) a plurality of units of at least one mass transfer packing media located within said basin, said mass transfer packing media sized and shaped to comprise a surface area adapted to support the growth of biological organisms thereon, and a void area within and between said packing media, and resulting when a plurality of mass transfer packing media are packed together in a substantial void space within said basin, said mass transfer packing media extending upward from said inner bottom surface for a height $H_1$;

(c) a standpipe, and a distributor pipe, said distributor pipe in fluid communication with said standpipe, said standpipe mounted to downwardly direct wastewater to be treated toward said distributor pipe, said distributor pipe mounted in said basin, said distributor pipe comprising a plurality of discharge outlets adapted to discharge wastewater therefrom so that said wastewater reaches said mass transfer packing media;

(d) mounted above and substantially covering said mass transfer packing media, at least one screen layer, said at least one screen layer comprising a screen sized and shaped to substantially prevent a granular media of preselected size from downwardly penetrating said at least one screen layer to reach said at least one mass transfer packing, so as to protect said at least one mass transfer packing media against receipt of granular media thereon;

(e) above said at least one screen layer and within said basin, a first granular media of a first preselected size, said first granular media extending upward from said at least one screen layer for a height $H_2$;

(f) above said first granular media, a number N of upper granular media layers each of a preselected size, wherein N is a positive integer, and wherein said upper granular media layers extend (1) for a height $H_3$ between said first granular media layer and the elevation of said peripheral rim, (2) upward beyond said peripheral rim to a top surface portion for a height $H_4$, and (3) laterally outward from said basin and downward toward said substrate to a peripheral edge.

2. The apparatus as set forth in claim 1, wherein said substrate comprises scarified native earth.

3. The apparatus as set forth in claim 2, wherein said peripheral edge defines, inwardly of said peripheral edge, a gross absorption area.

4. The apparatus as set forth in claim 3, wherein said outer bottom surface of said basin has a basin footprint area, and wherein said gross absorption area minus said basin footprint area comprises a net absorption area.

5. The apparatus as set forth in claim 4, wherein said gross absorption area is utilized for absorption of treated effluent.

6. The apparatus as set forth in claim 5, wherein said preselected width Au is approximately five feet.

7. The apparatus as set forth in claim 3, wherein said basin has a centerline, and wherein said basin in installed on a slope with said centerline substantially perpendicular to said slope, and wherein an absorption length $A_L$ is defined within said peripheral edge along said centerline, and wherein an absorption width $A_W$ is provided in a downhill direction from said centerline of said basin in a preselected width $A_U$ in an uphill direction from said centerline of said basin.

8. The apparatus as set forth in claim 7, wherein said slope is five degrees or greater.

9. The apparatus as set forth in claim 1, wherein said substrate comprises a substantially water impervious horizontal slab.

10. The apparatus as set forth in claim 1, wherein said substrate comprises a substantially water impervious synthetic liner.

11. The apparatus as set forth in claim 1, further comprising, above said first granular media of first preselected size, one upper granular media layer having a second preselected size, said one upper granular media layer extending between said first granular media and said top surface portion.

12. The apparatus as set forth in claim 11, wherein said preselected size of said one upper granular media is smaller than said first preselected size of said first granular media.

13. The apparatus as set forth in claim 1, wherein said first granular media comprises coarse sand.

14. The apparatus as set forth in claim 1, wherein said upper granular media comprises medium sand.

15. The apparatus as set forth in claim 1, wherein said standpipe further comprises an upper end, and wherein said standpipe extends vertically for a distance sufficient that said upper end extends above said top surface of said N of upper granular media layers.

16. The apparatus as set forth in claim 1, wherein said basin is manufactured in a lightweight easily transportable material.

17. The apparatus as set forth in claim 16, wherein said basin is manufactured in a moldable plastic material.

18. The apparatus as set forth in claim 16, wherein said basin is manufactured in fiberglass reinforced plastic.

19. The apparatus as set forth in claim 1, wherein said at least one mass transfer media comprises a plurality of pipe sections.

20. The apparatus as set forth in claim 19, wherein each one of said plurality of pipe sections comprises a preselected length of polyvinylchloride pipe.

21. The apparatus as set forth in claim 20, wherein said preselected length of said pipe sections comprise one-half inch lengths.

22. The apparatus as set forth in claim 21, wherein said pipe sections comprise thin wall polyvinylchloride pipe of one-half inch diameter.

23. The apparatus as set forth in claim 1, wherein said distributor pipes are within said basin and within said first mass transfer packing media.

24. The apparatus as set forth in claim 1, wherein said apparatus is configured for upflow movement of wastewater, and wherein influent wastewater fed to said treatment module ascends through said first mass transfer media, and thence through said first granular media layer, and thence through at least one of said N number of upper media layers, and thence over said peripheral rim of said basin, and then through at least one of said N number of upper media layers.

25. The apparatus as set forth in claim 1, wherein said at least one screen comprises a coarse screen and a fine screen.

26. The apparatus as set forth in claim 25, wherein said fine screen comprises a bridal veil synthetic fabric material.

27. The apparatus as set forth in claim 1, wherein said basin comprises a rectangular shaped concrete tank structure having an open top.

28. The apparatus as set forth in claim 1, wherein height $H_B$ from said bottom surface of said basin to said selected elevation of said peripheral rim is about thirty inches or less.

29. The apparatus as set forth in claim 1, wherein the ratio between said basin volume V (in units of cubic feet) and the waste water treatment capacity of said apparatus (in units of gallons of influent per day) is approximately 1.0 or less.

30. The apparatus as set forth in claim 1, wherein said distributor pipe comprises a perforated pipe is positioned substantially horizontally adjacent the interior bottom surface of said basin.

31. The apparatus as set forth in claim 1, further comprising, in said standpipe, a high level sensor.

32. The apparatus as set forth in claim 31, further comprising a control panel, and wherein said control panel comprises a high level alarm responsive to said high level sensor in said standpipe.

33. A system for treating wastewater comprising a plurality of water treatment apparatuses as set forth in claim 1 positioned adjacently, and hydraulically oriented for parallel influent flow.

34. An apparatus as set forth in claim 1 and further comprising a multi-stage wastewater treatment system for on-site treatment of wastewater such as sewage, comprising:
(a) a two-compartment septic tank, said two compartment septic tank configured for receipt of said wastewater in a first compartment and transfer of said wastewater to a second compartment after partial treatment of said wastewater;
(b) a pump tank for receiving wastewater from said two-compartment septic tank;
(c) wherein said pump tank is connected to said standpipe of said wastewater treatment module.

35. The wastewater treatment system as set forth in claim 34, wherein said sewage further comprises nitrates at a sufficiently elevated level so as to require treatment for reduction of nitrates, and wherein said wastewater treatment system further comprises a nitrate treatment unit.

36. The wastewater treatment system as set forth in claim 35, wherein said nitrate treatment unit comprises a recycle line from said pump tank to said two compartment septic tank, and wherein said two compartment septic tank comprises a riser above said first compartment in said septic tank, and wherein a water permeable container having therein a plurality of packing media is provided in said riser, and wherein said recycle line provides recycled wastewater from said pump tank and discharged said recycled wastewater on to said packing media, wherein nitrate concentration in treated effluent from said system is reduced.

37. The wastewater treatment system as set forth in claim 36, wherein said water permeable container comprises a sack having ½ inch lengths of ½ inch diameter PVC pipe therein.

38. The wastewater treatment system as set forth in claim 35, wherein said nitrate treatment unit comprises a recycle line from said pump tank to a spray nozzle in said riser in said first compartment of said two compartment septic tank, said spray nozzle oriented so as to aereate recycled wastewater discharged from said spray nozzle into said first compartment of said septic tank.

39. The wastewater treatment system as set forth in claim 35, wherein said nitrate treatment unit comprises an extended surface media on at least one wall of said pump tank, and wherein a recycle line is provided within said pump tank, and wherein said recycle line provides recycled wastewater from said pump tank and discharges said recycled wastewater on to said extended surface media in said pump tank.

40. The system as set forth in claim 39, wherein said extended surface media comprises an outdoor rug.

41. The system as set forth in claim 35, wherein said nitrate treatment unit comprises an air sparged packed column in said second compartment of said two compartment septic tank.

42. The system as set forth in claim 41, wherein said air sparged packed column comprises an outer cylindrical shell, a lower retaining screen, an air line running to a discharge location below said lower retaining screen, and a plurality of packing media above said screen and contained within said shell.

43. The system as set forth in claim 42, wherein said packing media comprises a plurality of packing pieces of ½ inch lengths of ½ inch diameter PVC pipe.

44. The system as set forth in claim 34, wherein said wastewater further comprises suspended particulates, and wherein said suspended particulates are substantially physically removed from said wastewater by said two or more preselected media portions.

45. The system as set forth in claim 34, wherein said mass transfer packing media provides sites for biological growth without plugging of said media, so that at least a portion of said organic matter in said wastewater may be consumed by said biological growth.

46. The system as set forth in claim 34, wherein said mass transfer packing media comprises a raschig ring.

47. The system as set forth in claim 46, wherein said raschig rings comprise short pipe sections.

48. The system as set forth in claim 47, wherein the material of composition for said pipe sections is selected from the group consisting of (a) polyvinylchloride, and (b) high density polyethylene.

49. The system as set forth in claim 48, wherein said pipe sections are approximately one-half inch long.

50. The system as set forth in claim 49, wherein said pipe sections are approximately one-half inch in diameter.

51. The system as set forth in claim 34, wherein a plurality of wastewater treatment modules are provided.

52. The system as set forth in claim 51, wherein three wastewater treatment modules are provided.

53. The system as set forth in claim 34, or in claim 51, or in claim 52, further comprising an impervious substrate below said treatment module, said impervious substrate including a treated effluent collection system for capturing said treated effluent.

54. A method for treatment of a wastewater having organic matter therein, wherein said wastewater is processed in a septic tank and then in a treatment module, said method comprising;
(a) providing a watertight basin, said watertight basin situated on a substrate, said basin having a bottom surface adjacent said substrate, upwardly extending sidewalls, and a peripheral rim over which water placed in said basin passes;
(b) providing a plurality of units of at least one mass transfer packing media in said basin, said mass transfer packing media sized and shaped to comprise a surface area adapted to support the growth of biological organisms thereon, and resulting, when packed together, in a void space within said basin;
(c) providing a standpipe and a distributor pipe in fluid communication with said standpipe, said standpipe mounted to downwardly direct wastewater to be treated toward said distributor pipe, said distributor pipe mounted in said basin, said distributor pipe comprising a plurality of discharge outlets adapted to discharge wastewater therefrom so that said wastewater reaches said mass transfer packing media;
(d) providing, above and substantially covering an area interior to said peripheral rim of said basin, at least one screen layer, said at least one screen layer comprising a screen sized and shaped to substantially prevent a granular media of preselected size from downwardly penetrating said at least one screen to reach said at least one mass transfer packing, so as to protect said at least one mass transfer packing media against receipt of granular media thereon;

(e) providing, above said at least one screen layer, a granular or porous filter media having interstitial pores, said granular or porous filter media further comprising two or more preselected media portions, said two or more preselected media portions comprising at least (A) a first media portion, and (B) a final media portion, said final media portion being finer in size than said first media portion;

(f) directing said wastewater to said septic tank;

(g) directing said wastewater from said septic tank to said standpipe, and thence to said distributor pipe;

(h) allowing said wastewater to move upward through said at least one mass transfer packing media;

(i) allowing said wastewater to migrate upward into said first media portion;

(j) allowing said wastewater to flow from said first media portion to said final media portion, without saturating all of said final media portion with said wastewater;

(k) allowing said wastewater to flow from said final media portion to said substrate;

(l) wherein said wastewater is effectively treated for removal of organic matter, so as to provide a treated wastewater effluent.

55. The method as set forth in claim 54, wherein said wastewater passes through a separator between said mass transfer packing and said preselected media portions, said separator substantially preventing said preselected media portions from migrating into adjacent preselected mass transfer media.

56. The method as set forth in claim 54, wherein said wastewater further comprises suspended particulates, and wherein said suspended particulates are substantially physically removed from said wastewater by said two or more preselected media portions.

57. The method as set forth in claim 54, wherein said mass transfer packing media provides sites for biological growth without plugging of said media, so that at least a portion of said organic matter in said wastewater may be consumed by said biological growth on said mass transfer packing media.

58. The method as set forth in 54, further comprising the step of allowing ambient air to pass through said unsaturated final media portion to evaporate a portion of said wastewater.

59. The method as set forth in claim 54, wherein said wastewater comprises sewage effluent.

60. The method as set forth in claim 54, wherein said first media portion is comprises coarse sand.

61. The method as set forth in claim 54, wherein said final media portion comprises fine sand.

62. The method as set forth in claim 61, wherein said fine sand has an effective particle size from about 0.50 mm to about 0.60 mm.

63. The method as set forth in claim 62, wherein said fine sand has a uniformity coefficient of less than about 1.5.

64. The method as set forth in claim 54, wherein said treated wastewater effluent is collected for reuse.

65. The method as set forth in claim 64, wherein said collected treated wastewater us stored for reuse.

66. The method as set forth in 65, wherein said treated wastewater effluent is reused for landscape irrigation.

67. The method as set forth in claim 54, wherein said treatment module is at least partially situated on a scarified surface native earth, and wherein said treated wastewater is directed into said scarified native earth, for recharge of local groundwater.

* * * * *

UNITED STATES PATENT AND TRADEMARK OFFICE
CERTIFICATE OF CORRECTION

| | | |
|---|---|---|
| PATENT NO. | : 7,081,203 B2 | Page 1 of 1 |
| APPLICATION NO. | : 10/839974 | |
| DATED | : July 25, 2006 | |
| INVENTOR(S) | : Glenn Helm | |

It is certified that error appears in the above-identified patent and that said Letters Patent is hereby corrected as shown below:

IN THE SPECIFICATION:

Column 7, line 57, after the words "advantageous to", delete "utilized", and substitute therefore --utilize--.

Column 12, line 5, delete "improvements", and substitute therefore --improvement--.

At end Column 14, in TABLE 2, after heading "Shutdown/Simulate Two Week Vacation", ninth line down from heading, beginning with "Upper Bound", after the numbers "561.I389   53.02   434   6.978   32", delete "2.338", and substitute therefore --2.388--.

Column 18, last line in TABLE 3, after words "Upper Bound   11.01   5.40", delete "8.14", and substitute therefore --6.14--.

IN THE CLAIMS:

Column 19, line 47, delete "6.", and substitute therefore --7. --.

Column 19, line 47, delete "5", and substitute therefore --6--.

Column 19, line 49, delete "7.", and substitute therefore --6.--.

Column 19, line 50, after the words "wherein said basin", delete "in" and substitute therefore --is--.

Column 19, line 57, after the words, "as set forth in claim", delete "7", and substitute therefore --6--.

Column 21, line 9, after the words "An apparatus as set forth in Claim 1", delete "and".

Column 24, line 25, after the words "treated wastewater", delete "us" and substitute therefore --is--.

Column 24, line 26, after the words "as set forth in", insert --claim--.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,081,203 B2 |
| APPLICATION NO. | : 10/839974 |
| DATED | : July 25, 2006 |
| INVENTOR(S) | : Glenn Helm |

It is certified that error appears in the above-identified patent and that said Letters Patent is hereby corrected as shown below:

The title page should be deleted and substitute therefore the attached title page.

Drawings:
Delete Figs. 14, 17, 21 and substitute therefore the attached Figs. 14, 17, 21 as shown on the attached pages.

Sheet 3, FIG. 4, reference numeral 110 should be replaced by reference numeral 102.

Sheet 3, FIG. 4, reference numeral 76 should be replaced by reference numeral 48.

Remove Fig. 4 on sheet 3, and replace with Fig. 4 below.

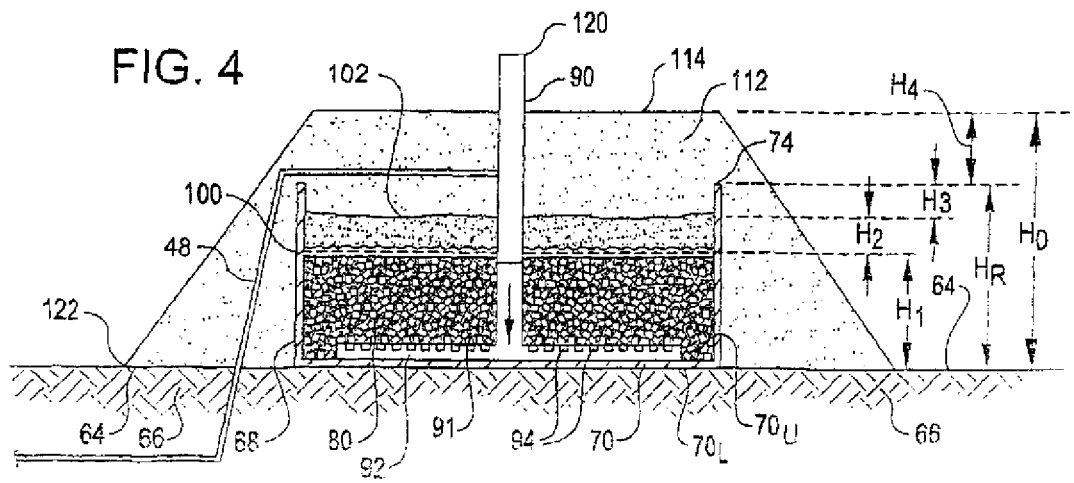

Signed and Sealed this
Fifteenth Day of November, 2011

David J. Kappos
*Director of the United States Patent and Trademark Office*

CERTIFICATE OF CORRECTION (continued)
U.S. Pat. No. 7,081,203 B2

Sheet 6, FIG. 14, reference numeral 105 should be replaced by reference numeral 106.

Remove Fig. 14 on sheet 6, and replace with Fig. 14 below.

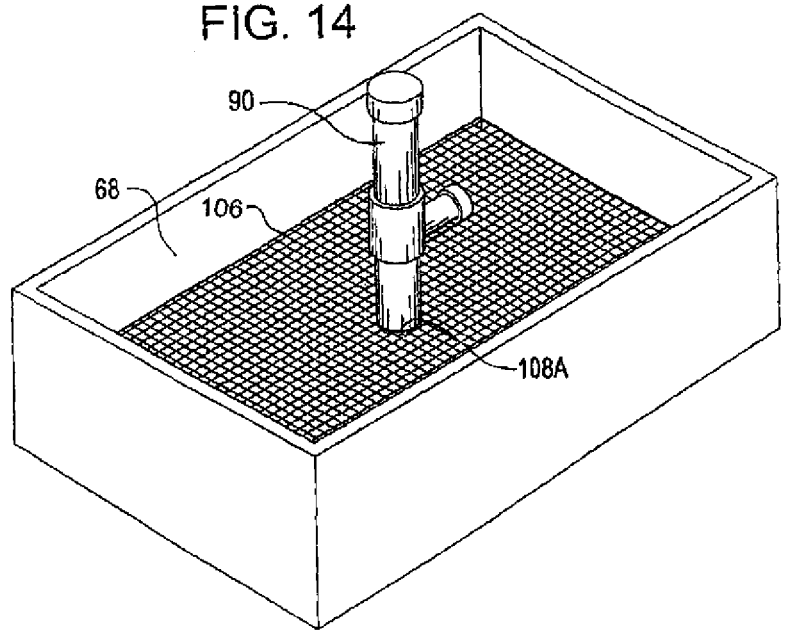

Sheet 8, FIG. 17, reference numerals 152 and 204 are to be added.

Remove Fig. 17 on sheet 8, and replace with Fig. 17 below.

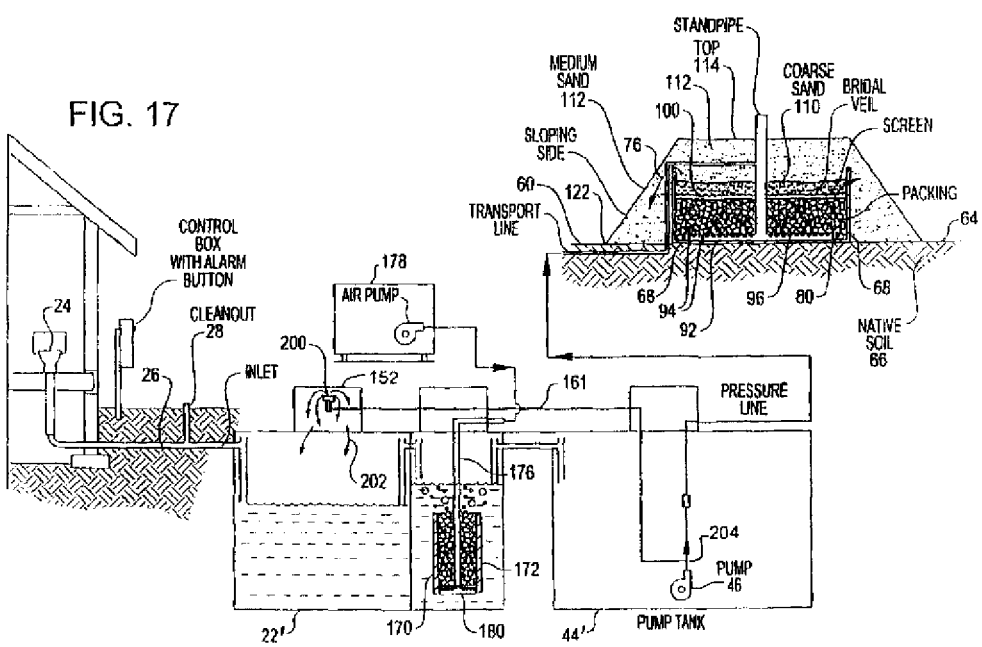

CERTIFICATE OF CORRECTION (continued)

Sheet 11, FIG. 21, reference numeral 238 is to be added.

Remove Fig. 21 on sheet 11, and replace with Fig. 21 below.

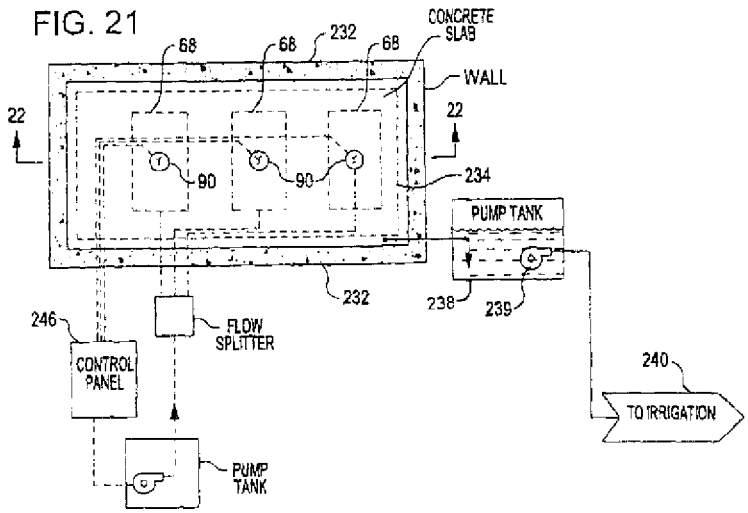

Column 7, line 59, after the word "FIG.", delete "14" and substitute therefore --13--.

Column 8, line 1, after the words "to also include", delete "as shown in FIG. 14,".

Column 8, line 4, after the word "FIG.", delete "23" and substitute therefore --3--.

Column 8, line 4, after the words "coarse sand", insert --102--.

Column 8, line 17, after the words "coarse sand", insert --102--.

Column 9, line 5, after the words "recycle line", delete "150" and insert therefore --161--.

Column 9, line 11, after the words "recycle line", delete "160" and insert therefore --161--.

Column 9, line 12, after the words "pump tank", delete "22'" and insert therefore --44'--.

Column 9, line 32, after the words "recycle line", delete "160" and insert therefore --161--.

Column 9, line 35, after the words "in line", delete "160" and insert therefore --161--.

Column 9, line 40, after the word "compartment", delete "20" and insert therefore --30--.

Column 10, line 17, delete "68" and insert therefore --62--.

(12) United States Patent
Helm

(10) Patent No.: US 7,081,203 B2
(45) Date of Patent: Jul. 25, 2006

(54) COMPACT SURFACE MOUNTED ON-SITE WASTEWATER TREATMENT UNIT

(76) Inventor: Glenn Helm, 25448 Port Gamble Rd. NE., Poulsbo, WA (US) 98370

(\*) Notice: Subject to any disclaimer, the term of this patent is extended or adjusted under 35 U.S.C. 154(b) by 54 days.

(21) Appl. No.: 10/839,974

(22) Filed: May 6, 2004

(65) Prior Publication Data

US 2005/0205491 A1 Sep. 22, 2005

Related U.S. Application Data

(60) Provisional application No. 60/553,819, filed on Mar. 16, 2004.

(51) Int. Cl.
*C02F 3/06* (2006.01)

(52) U.S. Cl. .......... 210/617; 210/747; 210/150; 210/151; 210/170; 210/532.2

(58) Field of Classification Search .......... 210/617, 210/797, 150, 151, 170, 259, 299, 265, 266, 210/532.2

See application file for complete search history.

(56) References Cited

U.S. PATENT DOCUMENTS

| | | | |
|---|---|---|---|
| 212,023 A | 2/1879 | Maeurer | |
| 690,333 A | 12/1901 | Wanner | |
| 699,345 A | 5/1902 | Provost, Jr. | |
| 800,187 A * | 9/1905 | Venable | 210/150 |
| 956,665 A * | 5/1910 | Ashley | 210/150 |
| 1,738,521 A | 12/1929 | Bomhoff | |
| 1,950,841 A * | 3/1934 | Crawford | 210/150 |
| 2,590,964 A | 4/1952 | Halvorson | |
| 3,123,556 A | 3/1964 | Gilbert | |
| 3,126,333 A | 3/1964 | Williams | |
| 3,215,274 A | 11/1965 | Schreiber | |
| 3,219,577 A | 11/1965 | Powers, III | |
| 3,238,124 A | 3/1966 | Burton | |
| 3,407,935 A | 10/1968 | Burton | |
| 3,543,937 A | 12/1970 | Choun | |
| 3,617,541 A | 11/1971 | Pan | |
| 3,770,623 A * | 11/1973 | Seidel | 210/170 |
| 3,774,768 A | 11/1973 | Turner | |
| 3,882,027 A * | 5/1975 | Lunt | 210/150 |
| 3,925,206 A * | 12/1975 | Dea | 210/170 |
| 3,933,629 A | 1/1976 | Smith | |
| 3,950,252 A | 4/1976 | Jordan et al. | |
| 3,957,634 A | 5/1976 | Orensten et al. | |

(Continued)

FOREIGN PATENT DOCUMENTS

CA 2065350 3/1991

(Continued)

*Primary Examiner*—Christopher Upton
(74) *Attorney, Agent, or Firm*—R. Reams Goodloe, Jr.

(57) ABSTRACT

A compact, ground surface mounted wastewater treatment unit module. The module is surface mounted on a selected substrate such as a scarified native soil. A watertight receiving basin is located on the substrate. The basin is at least partially filled with a lower layer of packing media, suitable for support of biological growth, and then with at least a first and a final layer of a porous granular media. A standpipe introduces wastewater to be treated, and such wastewater is distributed to the packing at the lower reaches of the basin. The wastewater flows up through the packing, and into the first layer of a porous granular media, and thence upwardly and outwardly via capillary action and molecular attraction, and ultimately though the final porous granular media. Treated wastewater is either collected or absorbed in an absorption foot interface between the final medium and the native earth below.

67 Claims, 11 Drawing Sheets